United States Patent [19]

Hedberg et al.

[11] Patent Number: 4,724,495
[45] Date of Patent: Feb. 9, 1988

[54] DIGITAL FORMATTER, CONTROLLER, AND HEAD ASSEMBLY FOR VIDEO DISK RECORDING SYSTEM, AND METHOD

[76] Inventors: David J. Hedberg, 6542 Ocean Crest Dr., #C305, Rancho Palos Verdes, Calif. 90274; Edward P. Denta, Jr., 7200 La Palma Ave., Buena Park; Victor E. Jo Chiong, 2 Amie Ave., #5, Torrance, both of Calif. 90620

[21] Appl. No.: 784,674

[22] Filed: Oct. 4, 1985

Related U.S. Application Data

[62] Division of Ser. No. 441,790, Nov. 15, 1982, Pat. No. 4,577,240.

[51] Int. Cl.⁴ .............................. G11B 5/02; G11B 5/09
[52] U.S. Cl. .......................................... 360/22; 360/70; 360/48
[58] Field of Search ...................... 360/22, 48, 98, 40, 360/97, 32, 62, 64, 67, 68, 70

[56] References Cited

U.S. PATENT DOCUMENTS

| | | | |
|---|---|---|---|
| 3,314,057 | 4/1967 | Mogtader | 360/98 |
| 3,781,489 | 12/1973 | Brand | 360/97 |
| 3,831,191 | 8/1974 | Gold | 360/22 |
| 3,898,627 | 8/1975 | Hooker et al. | 364/900 |
| 4,209,809 | 6/1980 | Chang et al. | 360/53 |
| 4,214,280 | 7/1980 | Halfhill et al. | 360/60 X |
| 4,270,150 | 5/1981 | Diermann et al. | 360/22 X |
| 4,270,154 | 5/1981 | Crawford | 360/98 |
| 4,318,145 | 3/1982 | Frandsen | 360/98 X |
| 4,355,376 | 10/1982 | Gould | 371/10 X |
| 4,376,933 | 3/1983 | Saran et al. | 364/900 X |
| 4,402,025 | 8/1983 | Anderson et al. | 360/98 |
| 4,405,952 | 9/1983 | Slakmon | 360/54 X |
| 4,577,240 | 3/1986 | Hedberg et al. | 360/22 |

OTHER PUBLICATIONS

IBM-TDB, vol. 15, No. 11 (Apr. 1973), Disk File with Fixed and Movable Heads, by D. I. Frush, p. 3412.

*Primary Examiner*—Stuart N. Hecker
*Assistant Examiner*—Alyssa H. Bowler
*Attorney, Agent, or Firm*—Lewis Anten

[57] ABSTRACT

A real-time magnetic digital video disk recording system has been developed for applications in on-line digital imaging systems and off-line fast access image storage and retrieval buffers. The disk recorder uses new high density recording technology and Winchester computer drive technology in a unique peripheral configuration which is fully synchronized to video system timing, provides for flexible formatting, achieves fast random access to a large video image file, and eliminates the need for complex data controllers. The recorder includes two independent actuator and head assemblies for alternately recording successive video fields on separate tracks on separate zones A and B of a disk stack. Movement of one of the actuators and head assemblies is controlled and occurs within a field time to skip tracks containing media flaws to achieve real time digital video recording. The invention bidirectionally receives and transmits data from buses of one size into buses of another size and formats the data into a recordable, compatible format, all under program control. The invention provides unique spindle speed timing acquisition. The invention provides a new circuit for the magnetic read/write head.

6 Claims, 20 Drawing Figures

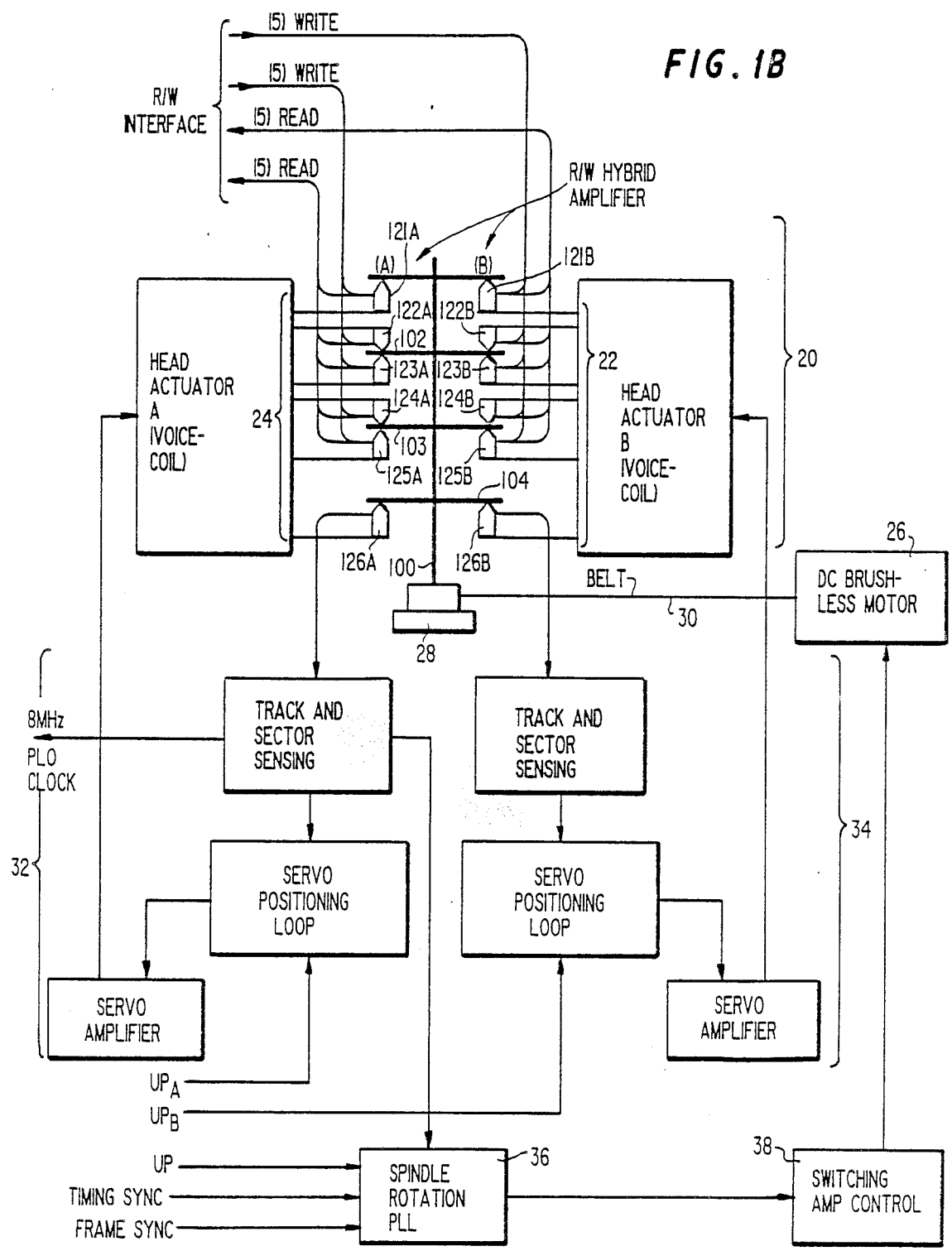

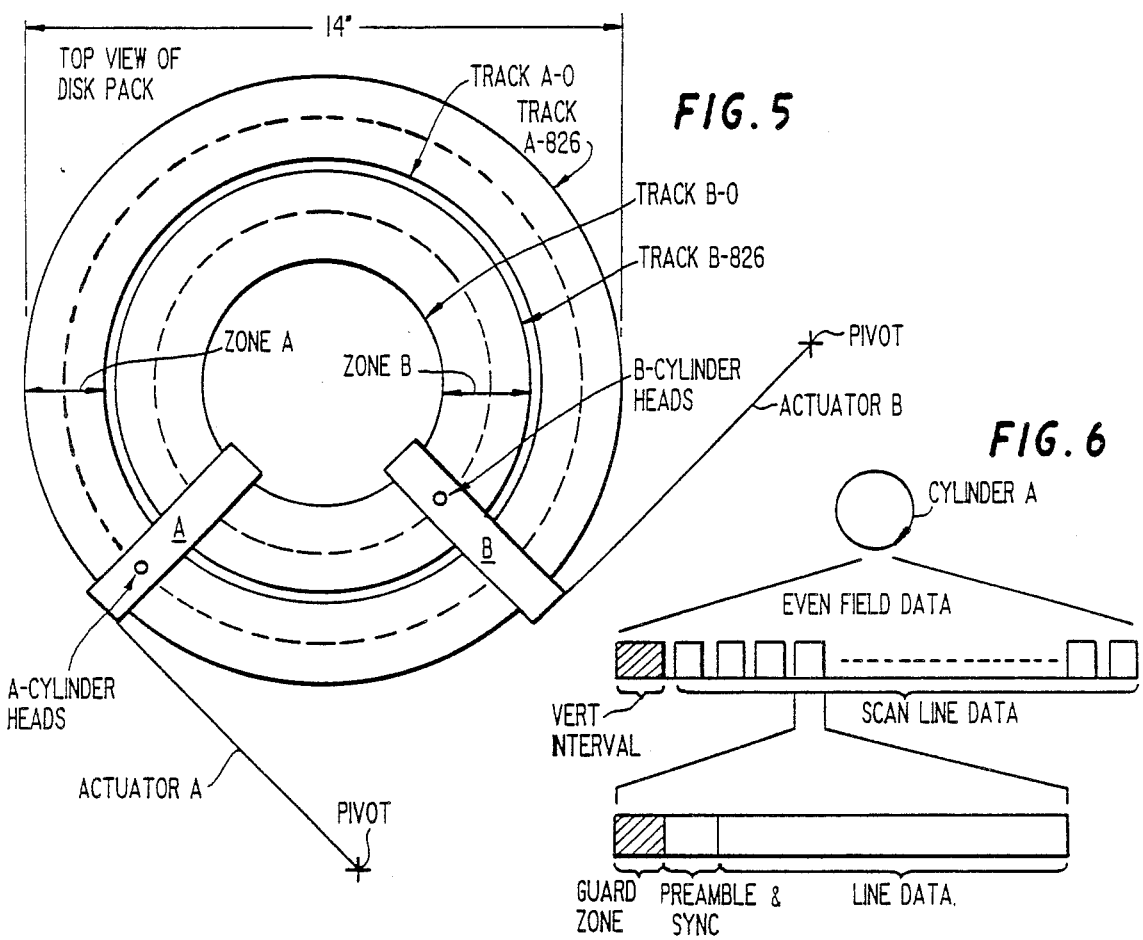
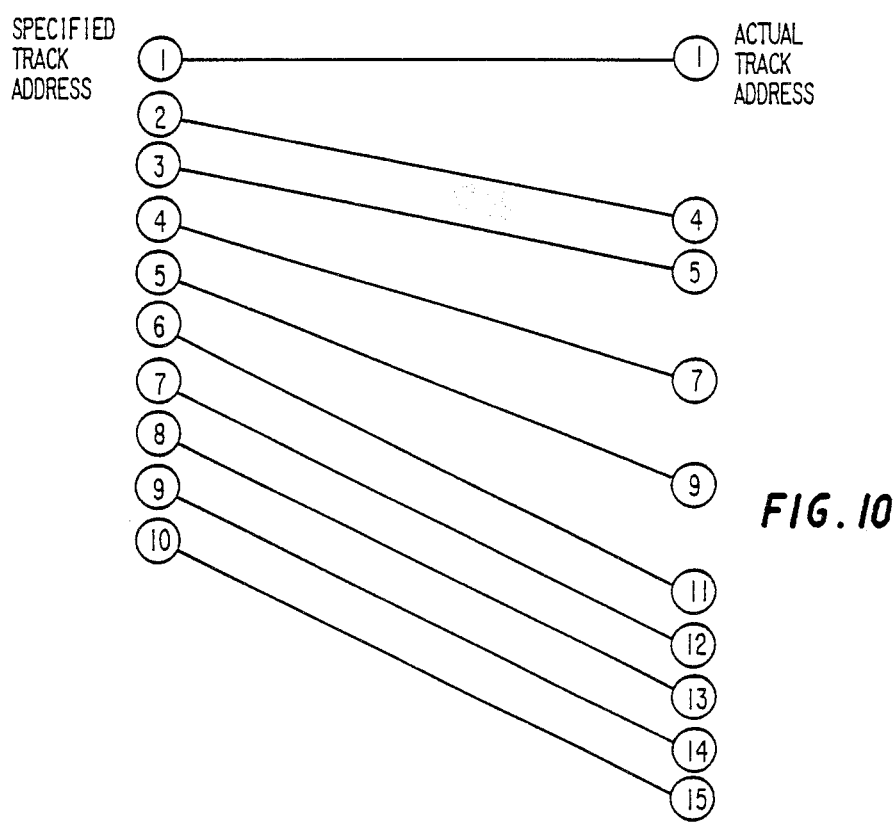

ACTUATOR CONTROL UNIT
FIRMWARE FLOWCHART

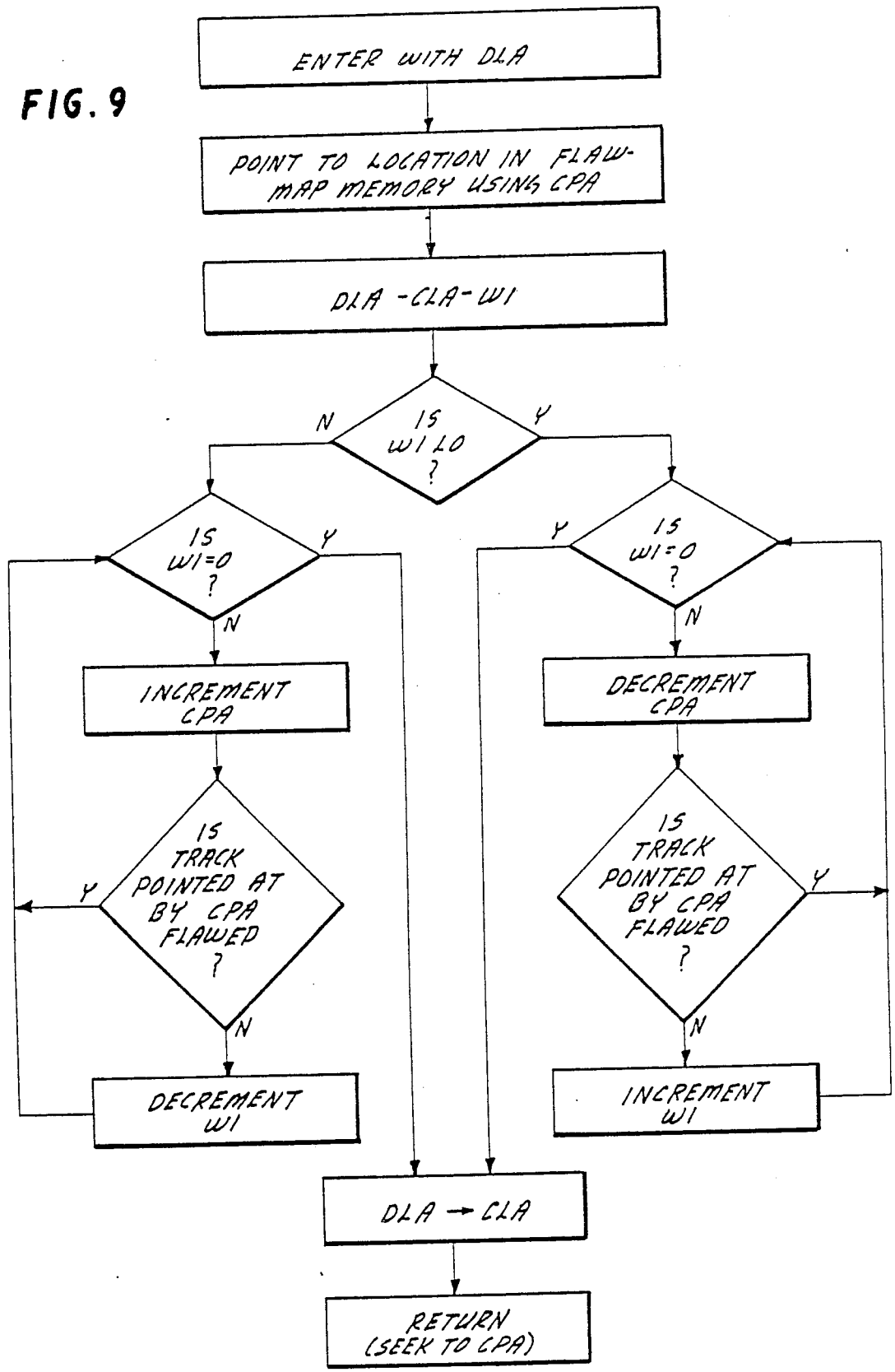
FIG. 9 — FLAWMAP SUBROUTINE FLOWCHART

DIGITAL FORMATTER, CONTROLLER, AND HEAD ASSEMBLY FOR VIDEO DISK RECORDING SYSTEM, AND METHOD

This is a division of application Ser. No. 06/441,790, filed on Nov. 15, 1982, now U.S. Pat. No. 4,577,240.

FIELD OF THE INVENTION

This invention relates to the development of all electronic, digital radiography departments for hospitals in which remote X-ray imaging centers are equipped for on-line acquisition, processing and display of radiographs, and are connected via communication links to a centralized radiograph library for off-line recording, retrieval, review, image processing, and archival storage of images. Current technological and cost bottlenecks exist with large high speed image memory stores for both the on-line acquisition and display segment, as well as the off-line communications and archival storage segments of the department, primarily due to the high information content of high quality X-ray images, the pressing needs for a digital storage format, and high image sampling rates. Presently available computer mass stores are not economical for these requirements.

The present invention addresses the role and development of a low cost magnetic digital video disk recorder for use in electronic radiography systems and time magnetic digital video disk recorder. It is a logical extension of present video disk recorder technology which overcomes the limitations associated with traditional analog video storage while retaining the fast access, high storage density, reliability, and erasability features of magnetic video disks. The invention provides digital magnetic video disk technology that can complement solid state and optical disk memory technology within the radiography system, performing the role of fast-access temporary real-time image buffer for the dynamic acquisition and display segment of the system, and also can fill the role of fast access, temporary staging and queing buffer for centralized, slower archival mass memory systems.

BACKGROUND OF THE INVENTION

Magnetic video disk recorder systems, which were first developed in the early 1960s, incorporate either rigid disk media for fixed but erasable storage or floppy disk media for removable storage. The disks typically rotate at video frame rate, 1500 RPM or 1800 RPM, and use saturated narrowband FM recording of the modulated analog signal with one complete disk revolution storing a video frame signal. A synchronized stepping motor is used for positioning the recording head over different tracks as video frames are recorded or replayed. Analog video disk recorders which are found in broadcast television, medical, and government applications achieve excellent specifications for video image storage density, cost per unit image capacity, acquisition and display bandwidth (real-time), and image access rates. Unfortunately, due to the short recording wavelength and high signal-to-noise ratio requirements of FM video, it becomes necessary in these systems to maintain head to media velocities of 1000 to 2000 inches per second, and head gap to media separations of only a few micro-inches. Floppy disk recorders require constant contact between head and coated oxide media in order to achieve adequate signal performance, thereby limiting useful head and media life to only a few hundred hours. Rigid disk recorders, on the other hand, greatly reduce contact wearing mechanisms by generating a moving film of air, or air bearing, to support the head at a fixed average distance above the media. The head flies 9 to 12 micro-inches above the surface in a high performance recorder. Depending on multiple factors including disk surface precision, air layer non-linearities near the mean free air molecular distance, head aerodynamic behavior, and head shock loading transients, contact between head and media occurs frequently enough to limit maintenance free periods in rigid disk analog recorders to about 2000 hours or less.

Relative to digital storage techniques, analog video recorders have fundamental limitations in signal fidelity, linearity, distortion artifacts, signal level repeatability, and time base accuracy. Indeed we are finding that newer digital radiography performance demands, digital processing compatibility needs, and maintenance free reliability requirements are exceeding the present capabilities of analog video disk recorders. Consequently, video imaging system designers are turning more toward solid state computer memories and computer disk drives for high performance digital video image storage.

Modern fixed disk computer drives presently obtain maintenance-free operating periods of 8000 to 12,000 hours average. Computer disk systems, together with external disk controllers, are configured for fast random access of individual computer records, or data blocks, which are transferred to the controller buffer under control of the unsynchronized disk clock. However, due to the moderately slow transfer rates involved, only one data read/write channel is utilized with a large number of switched heads in the disk pack. The configuration of standard computer disk drives for fast access wideband video storage is at best a great mismatch in application which is inefficient and expensive.

The digital video disk recorder of this invention uses established Winchester computer disk drive technology and video disk technology. Emphasizing high image quality performance and high reliability, the video disk recorder of this design enables synchronized real-time image data access, maximizes data transfer rate through high density parallel recording on relatively wide tracks, and eliminates the need for data controllers. The video disk recorder of this invention has an erasable storage capacity equivalent to a state-of-the-art 500 megabyte mainframe computer disk drive, but is a self-contained recording system implemented at a practical level of size, complexity, and cost relative to digital instrumentation recorders or computer-based data acquisition systems.

Image Memory Requirements in the All-Electronic Radiography Department

At the remote X-ray imaging centers, radiograph images must be acquired, stored temporarily, and displayed at real-time television rates for viewing on a CRT. A typical prior art electronic radiography imaging system utilizes a primary video frame store memory of capacity one or more frames (or fields) which must have, at minimum, the capability to grab and output single video fields or frames at real-time television data rates. This memory may be implemented using analog video disk, video tape, or digital frame store memories. Digital video frame stores have the great advantage, when properly implemented, of capturing the initial video signal event with high precision and maintaining the information without degradation over storage life. Moreover, with a minimal amount of additional digital hardware; image filtering, differencing, and other image processing operations can be performed at real-time video rates and the results can be retained in the digital frame store for output to a CRT display or secondary memory. A digital frame store has the ability to conveniently transfer images at sub-real-time (i.e., slow scan) rates over digital communication links to digital storage and retrieval systems.

Electronic X-ray imaging centers may also require a secondary video image store memory to record "live" or processed image data as it is acquired during a procedure, and to retain this data temporarily for further on-line post processing and replay. The requirements for secondary on-line video image memory may vary considerably depending on imaging mode, processing technique, and overall system architecture. For single frame exposures, integrated frame spot recording, and pulsed fluoroscopy, the secondary memory requirements typically range from zero to up to 100 frames per patient with image sampling rates up to ten frames per second. For dynamic organ imaging and real-time angiographic procedures, up to 1200 images per patient may be required at 50 or 60 field per second image sampling rates. In systems which use a digital frame store for primary memory, the primary to secondary memory transfer rate need only be at a fraction of television data rates corresponding to the ratio of image sampling rate to television frame rate. If an adequate communications link exists betwen the X-ray imaging center and the off-line library center, secondary memory capacity need only include enough storage for the total image set required for on-line analysis of one patient during a procedure. In such a system, the image storage will be temporary since images to be retained can be forwarded to the library center and recalled if necessary via the communications link.

Immediate on-line manipulation and analysis of the radiography imagery by the physician is usually a necessity. In particular, for pulsed fluoroscopy and dynamic imaging modes, real-time recording, processing, and display may be required during the procedure. Other requirements may include multi-mode post-processing and dynamic display of segments of the acquired imagery under automatic control or interactive operator control by the physician. The entire on-line patient image file and perhaps past imagery from the library may need to be readily accessible in order to complete the analysis and diagnosis. Generally, only a subset of images produced or displayed in the on-line mode will be retained for further analysis off-line or permanent storage. The temporary images can then be erased.

Image quality of the X-ray imaging center is of utmost importance. Stored image quality must match the image intensifier-TV chain capabilities. Digital radiography systems, presently under research, utilize digital images of 512×512 pixels with 9 to 10 bits per pixel before subtraction in order to achieve optimum subtracted image quality. High definition television (HDTV) direct imaging and HDTV fluoroscopy utilize 1024×1024 pixels with 8 bits per pixel to produce film quality images.

At the central radiograph library facility, images do not necessarily need to be manipulated at television bandwidth transfer rates nor do they need to be formatted and stored as full video field PCM pixel data. The emphasis in this part of the system is on longterm or permanent archival image storage, multi-user library access, and centralized image processing and data base services. A typical library system architecture may include an input-output subsystem with a high speed erasable staging and queing image buffer memory, an I/O processor, an archival storage and retrieval subsystem, a system controller, and an image processing computer.

The requirements of the I/O subsystem image buffer memory include temporary erasable storage, high speed ingest rate from users, high speed output rate to users, fast random access, and enough image capacity to handle the peak demand I/O scheduling and forwarding needs of the entire system. The image buffer memory must also handle the full video PCM picture information content. In some system architectures, the I/O image buffer memory may be required to provide synchronization and I/O functions at real-time television rates for compatibility with analog video interfaces. For the archival storage and retrieval subsystem, the image memory requirements are more strongly influenced by storage media costs. In this part of the system, image source coding techniques and error correction coding may help improve the efficiency of the media. Compatibility with television formats and transfer rates, and requirements for fast random access are less important.

SUMMARY OF THE INVENTION AND OBJECTS

The Video Disk Recorder

The video disk recording system of the present invention is an operatorless video storage peripheral which interfaces and synchronizes to a host system. The host system must contain a digital video bus, video sync timing, and blanking signals which define the real-time video data flow, and a microcomputer field address controller. Video data storage is organized on a one field per spindle revolution basis with each field (or half-frame for interlaced video) stored on one five track "cylinder" comprising the several data tracks and servo track of a stack of recording disks and a servo disk locked together on a common spindle. The disk pack rotates synchronously to the real-time video at a standard rate such as 3000 RPM (50 Hz V-sync) or 3600 RPM (60 Hz V-sync). Input/output data at the video disk recording system interface is transferred via the host system clock as a sequence of data blocks of arbitrary size synchronous to the video H-sync timing windows. Thus, disk storage sectoring is based on a free format which adapts to any particular video scanning standard. The video disk recorder of the present invention will accept virtually any real-time video data bus for recording up to an average data transfer rate of 145 megabits per second. For example, real-time 50 or 60 field per second recording of 512×512×10 bit video can be accommodated. A total of 1400 cylinders or fields of data, accessible at this bandwidth, can be stored in the disk unit. Average random access time to an image field is approximately 65 milliseconds.

The high transfer rate and synchronous access features of the invention enable easy interfacing to video-based digital imaging systems without complex data controllers and buffers. The storage format is convenient for many system functions including the following which comprise a list of general objects of the invention.

1. Real-time acquisition and display of digitized video data
2. Field memory stack for real-time image processing
3. Direct dynamic display modes
4. multi-image channel recording and replay
5. Image sampling rate converter
6. Image transfer rate converter
7. Multi-format storage
8. Mixed digital data/image storage An additional object of the invention is to provide a video disk recorder of the above character which provides capability to interface directly with real-time analog video systems through analog-to-digital (A/D) and digital to analog (D/A) converters.

The head and disk assembly of the present invention is a Winchester design which utilizes three fixed, plated metal data disks, one dedicated servo disk, and two rotary voice coil head positioners with six heads each. "Winchester," a generic name originally used by IBM for its 3340 disk drive technology, now popularly refers to the class of computer disk drives characterized by the following features.

1. The disks, read/write heads, and head actuators are contained in a hermetically sealed head disk assembly (HDA) in which air is continuously circulated.
2. The head load pressure is about 10 grams compared to 200-350 grams in traditional computer drives.
3. The read/write heads fly at 20 micro-inches from the disk surface instead of 40 microinches or more for removable media drives.
4. The heads are not loaded and retracted while the disk is moving but instead rest on a landing zone on the surface when the disk is idle; they take off and land when rotation begins or stops.
5. The disk surface is lubricated in order to aid take off and landing.
6. The magnetic film coating is generally thinner since the light-weight head flies closer to the disk surface than on conventional drives.

In general, the video disk recording system of the present invention includes a plurality of recording disks mounted for coordinated movement at the predetermined speed, and a servo disk mounted to rotate in aligned synchronism with said recording disks. A first plurality of read/write heads and a servo reading head are associated with said recording surfaces in a first zone and are controlled by an actuator (A). A second plurality of read/write heads and a servo head associated with the recording surfaces respectively, in a different zone and are controlled by actuator means (B) independent of said first actuator means.

Means are provided for synchronizing the video recording so that each video field is recorded on the single "cylinder" defined collectively by tracks on all recording disk surfaces of one zone taken together. The servo control disk establishes a position synchronizing signal to which all said data tracks are physically synchronized. The recording system includes means for formatting the video data stream from any parallel digital input width to the width of the recorder. Specifically, the disk memory comprises a parallel stack which accepts M bit words and said recorder further includes a word formatter for accepting data in N bit words and for converting the same into M bit words continually in real time of said video signal. The word formatter is programmable to change the value of N to any other number within its range.

The video disk recording system further includes a controller for the actuators (A) and (B) to skip tracks previously found to contain media errors by referring to permanent flaw map memories and recomputing new address locations.

A synchronization control for digital servo signal acquisition is provided and locks the servo disk speed to a reference phase by relatively rotating the rotating disk to the correct phase orientation while maintaining overall lock to reference until a once-around reference pulse is received coincident with the incoming video sync signal. A coincidence detector latches the system when coincidence occurs, and an indicator light indicates in-lock condition.

A new hybrid form of combined read/write amplifier is provided for each read/write head. It is miniaturized and mounted on each actuator and includes a write circuit for providing a current source in response to write signals, a read circuit for providing a low noise preamplifier, and solid state switching means for selectively interconnecting said read circuit or said write circuit to said head and for switching very rapidly between read and write circuit functions.

The present invention provides a recording format in which each of two head positioners or actuators accesses 826 cylinders of five parallel data tracks per cylinder. Each rotary actuator is positioned on a desired cylinder location using a conventional voice coil servo system based on a pre-recorded reference tracks on the servo disk. For interlaced video, odd field data are always recorded on the outer data recording zone by actuator A, and even field data on the inner recording zone by actuator B. While a cylinder is being recorded in zone A/B, the actuator A/B is held on track in the closed loop tracking mode while actuator B/A is stepped to the next cylinder address. Thus, the cylinders are alternatively at up to the video field rate during real-time recording of successive video frames.

Actuator movements are commanded at the beginning of vertical sync interval by the external controller. Up to one disk rotation period is allowed during real-time recording for stepping and settling of an actuator, thus permitting multiple cylinders to be traversed by the actuator. By controlling the synchronized actuator command sequence using software routines in the external controller, a large number of video playback modes are possible including slow motion, fast motion, stop action, slewing, looping, toggling, and random frame access. Track stepping sequences may also be programmed to skip known media defects without interrupting record/playback sequence timing.

The electronic subsystems of this invention utilizes five channels of recording electronics which are switched between the five data heads on actuator A and the five data heads on actuator B. Each recording channel reads or writes data at a fixed 30 megabit per second rate. Thus, each cylinder of the disk pack is accessed at the fixed transfer rate of 150 megabits per second.

The input/output data processing subsystem of the invention comprises a word format conversion circuit and an I/O buffer memory circuit. Both are used bi-directionally for both input data writing, and data reading output. The recorder-host interface format is a selectable parallel word size of 6 to 10 bits per word. Word re-packing and data stuffing techniques are used to convert from I/O words to channel words while maximizing storage efficiency. The I/O buffer memory is configured as a five channel elastic buffer between the I/O interface data port and the digital FM modem recording electronics, accommodating differences between the clock frequencies and data formats of these interfaces. The memory is double buffered to provide continuous duty operation for either read or write. The buffer capacity is 12K five-bit parallel channel words. Timing skew correction and time base correction of playback data from the disk tracks are also performed by the I/O buffer memory.

High density data recording is accomplished in this invention by the read/write electronics subsystem which contains a group of five digital FM modems, read/write switches, and read/write amplifiers. The modulated FM signals are switched electronically between the head assemblies of actuator A and those of actuator B in synchronism with field timing. In order to achieve high density parallel recording without channel-to-channel crosstalk and excessive noise, it is necessary to provide amplification of the head signals on the moving actuator arms near the individual recording heads. This is accomplished with special wideband hybrid integrated circuit read/write amplifier chips mounted on each arm of both actuators. The hybrid amplifiers enable a controlled impedance match from modem electronics to the heads using conventional lightweight cabling.

Two on-track servo positioning loops which derive position feedback from the servo read heads of each actuator provide positioning control to the voice coil drivers of the actuators. The actuator control subsystem contains two servo loops and voice coil current drivers, an Intel 8035 microprocessor servo controller, and I/O registers which interface the control subsystem to the external controller. An additional feature of the invention is a fault detection circuit, located in this subsystem, which continuously monitors for loss of disk speed lock. Any of these conditions cause the data write to be clamped off, the actuator heads to be retracted to cylinder zero, and the spindle to shut down until the fault is cleared, thus protecting valuable stored data.

The disk spindle rotation subsystem maintains rotating disk frequency and phaselock to the video timing. Comprised of a DC brushless motor, shaft encoder, switching amplifier, and digital phaselocked loop, the subsystem uses phase error information between video sync index and pre-recorded servo disk index in order to pulse width regulate the average motor current. In this manner, a maximum time base error of ± 1 microsecond is maintained at the disk playback point before electronic time base correction. An electrically controlled fail-safe mechanical brake quickly stops the disk spindle upon disk drive shutdown.

Table 1 is a summary of the specifications and physical characteristics of the video disk recorder system of the present invention.

TABLE 1

| Technological Characteristics | Performance Specifications |
|---|---|
| Media - Fixed 14 inch (3) | Single Data Head Transfer Rate - 30 megabits per second, fixed |
| Data Heads - High performance Winchester, ferrite (10) | Error Rate (Soft) 1 in $10^8$ or better |
| Number of Recording Surfaces - 5 | Actuator Seek Times (Each Actuator)- |
| Number of Heads per Surface - 2 | One Cylinder - 10 milliseconds |
| | One to Four Cylinder - 16 milliseconds |

TABLE 1-continued

| Technological Characteristics | Performance Specifications |
|---|---|
| Total Number of Cylinders - 1652 | Average - 50 milliseconds |
| Track Density - 680 T.P.I. | Full Stroke - 100 milliseconds |
| Bit Density - 20,000 B.P.I. maximum | Maximum Number of Cylinders w/Media Defects - 100 |
| Total Unformatted Storage Capacity - approximately 500 megabytes | Reliability, MTBF - estimated at 4500 hours |
| | Design Life - 5 yrs. until overhaul or replacement |

High density recording technology improvements are utilized in this design in order to provide large storage capacity and real-time digital video transfer rates at a practical level of complexity and cost. Basically, the data transfer rate per recording track has been increased from conventional computer rates of ten megabits per second with less than 1 in $10^{10}$ soft errors to 30 megabits per second with less than 1 in $10^8$ soft errors. Reduced error performance is acceptable for image data and results in a better trade-off for cost storage density. The key improvements involved in this invention are (a) the use of thin film plated nickel cobalt disks instead of conventional oxide coated disks, (b) high frequency ferrite heads, (c) a wideband hybrid integrated circuit read/write amplifier, and (d) a new digital FM encoding and decoding scheme.

Magnetic flux reversal density and the spatial definition of magnetized regions on the magnetic recording surface are determined largely by film thickness, material coercivity, and B-H hysteresis loop squareness. Compared with oxide particulate disk coatings, thin nickel cobalt films excel in all of these characteristics and provide higher output flux density per unit surface area. This invention uses thin metal film disks to obtain a greater linear recording bandwidth, as well as improvements in signal-to-noise ratio and overwrite margin levels of better than 10 dB over conventional media. Thus, by using a combination of the increased media dynamic range with a flux reversal efficient encoding process, the storage density has been increased to about 20,000 bits per inch on the inner disk track.

Problems of wideband read/write response of the head and channel-to-channel crosstalk have been solved in this invention by positioning both the read preamplifier and writing current amplifier, and the read/write switch on the head arms using a specially designed hybrid integrated circuit substrate. The read/write amplifier hybrid allows head/driver resonant frequency to be increased by 75% and achieves 9 to 10 nanosecond current transitions for accurate writing of saturated flux reversals. Positioning the preamp at the head results in high playback signal levels and accurate impedance match of the long head cable, thereby providing a wideband playback channel with excellent signal-to-interference ratio.

BRIEF DESCRIPTION OF THE DRAWINGS

FIG. 5 is a plan view in schematic form of the track layout and head positioning geometry taken generally from the lines 5—5 of FIG. 2.

FIG. 6 is a diagramatic view illustrating track organization of the video recorder of the present invention.

FIG. 9 is a flow chart of a flaw map track skipping subroutine.

FIG. 10 shows an example of a track skipping sequence.

DETAILED DESCRIPTION OF THE PREFERRED EMBODIMENTS

General

Figure 1A:
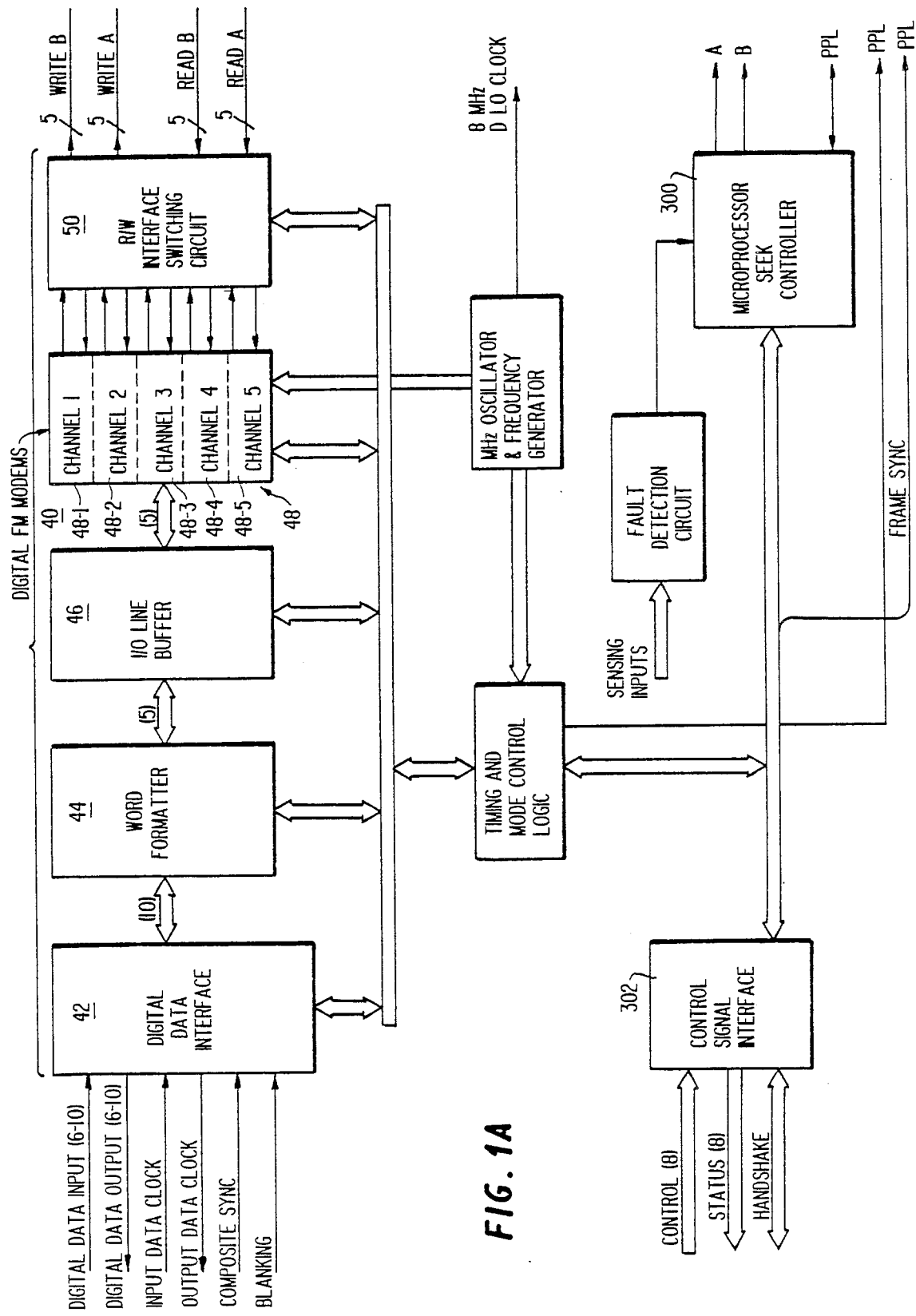
FIGS. 1A and B taken together show an electrical block diagram of a digital video disk recorder constructed in accordance with the present invention.

Referring now to FIGS. 1A and 1B, the digital video disk recorder of the present invention is illustrated in general block diagram form and comprises a combination of a number of interelated subsystems.

Thus, a multiple disk memory stack is organized at 20 and includes a bearing mounted spindle 100 mounting a stack of memory disks 101, 102, 103 which serve as magnetic data memory storage disks and a fourth servo disk 104 which establishes spatial reference.

Two sets (A) and (B), each comprising a plurality of magnetic heads are mounted on acutator arm assemblies 22,24 including voice coil positioners for shifting each of assemblies (A) and (B) independently. A motor 26 drives the spindle mounted pulley 28 through a belt 30. The spindle and several disks are all mounted as a rigid unit so that the spatial orientation of each point on each disk is fixed in relation to a spatial point on the servo reference disk 104. In this way the reference signal from the latter is used to establish a recording position of all the other heads and disks. (A) set track servo control system is provided in 32 and (B) set track servo control system is provided in 34. These serve to control the actuator arm assemblies of each head set. Position control and synchronization is obtained through a spindle control phase lock loop circuit 36 connected to the motor 26 in series through a switching amplifier control circuit 38.

The digital data processing system for converting digital data into standardized parallel form for converting it into recordable current signal is generally shown at 40. This system includes an incoming interfce 42, a word formatter 44, an I/O buffer 46 and a plurality of parallel digital FM modems 48-1, 48-2, . . . 48-5, each modem being connected in series with the prior circuits and having an output connected to the read/write head driver and solid state switching circuit 50.

Figure 2:
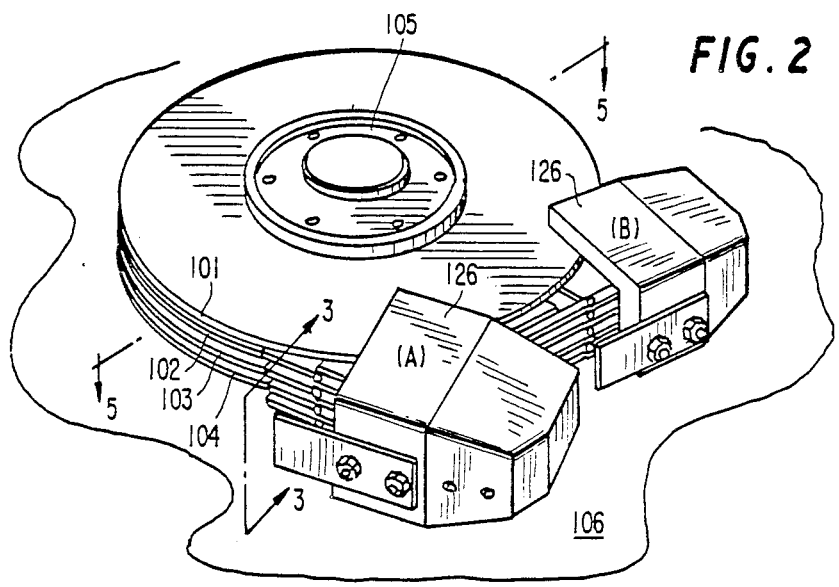
FIG. 2 is a perspective view of the video disk file of FIG. 1B.
Figure 4:
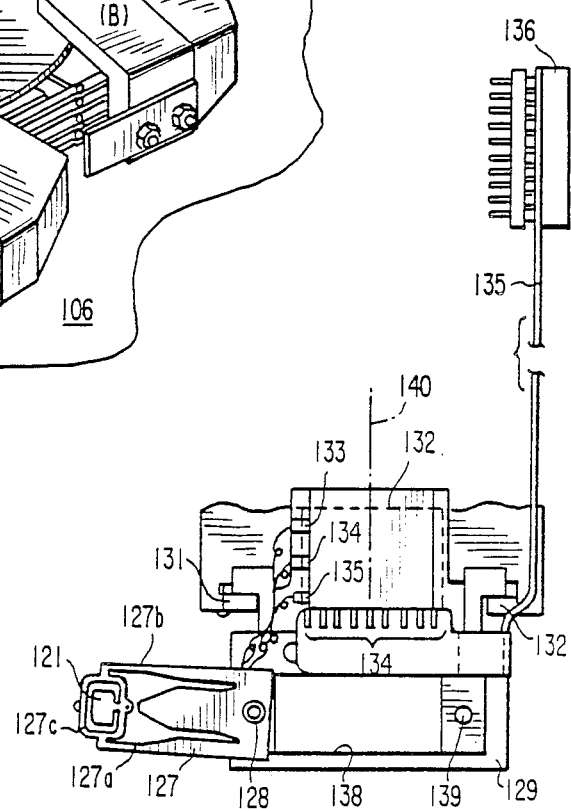
FIG. 4 is a cross-sectional view showing a single magnetic head assembly taken along lines 4—4 of FIG. 3.
Figure 3:
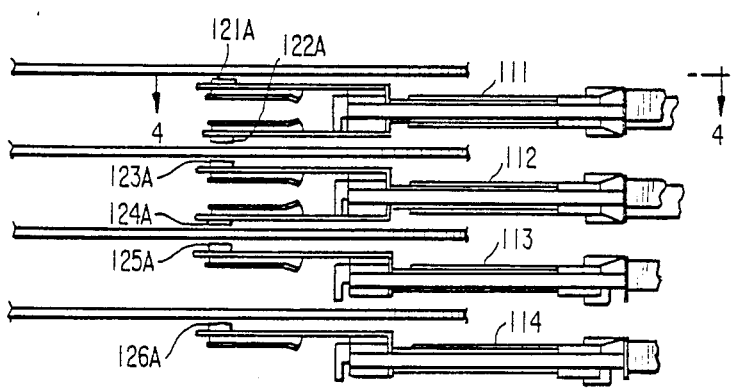
FIG. 3 is a detailed elevational view of one disk stack and recording arm assembly of FIG. 2 taken along the lines 3—3 thereof.

FIGS. 2 through 4 show the organization, both structurally and physically of the disk recording stack and associated arm actuators and head assemblies in detail as well as the relationship of the structure to the general recording scheme. FIG. 2 shows the spindle mounted stack of disks 101 through 104 mounted coaxially on the spindle terminated at its upper end with a cover 105. Actuators A and B are mounted on a support deck 106, a portion of which is shown and are each provided with a plurality of four arms arranged in a stack for innerleaving in between the disks as shown in FIG. 3. Each of arms 111, 112 and 113 and 114 mount one or more magnetic heads 121, 122, 123 and 124 at an outer extreme thereof. The ends are mounted in a gimbal spring 126 of known construction which has a pair of spaced arms 126a, 126b carrying a head mount 127 containing the head. Each of the springs 126 is fastened as with a fixed screw 128 to a head bracket 129 which is fastened to the end of the arm as with screws 131, 132 as shown in FIG. 4.

FIG. 4 also shows the positioning of hybrid circuit pack 132 on top of the bracket and lying in contact with a plurality of head pins 133, 134, 135 at one side which connect to the bifilar head as for example 121a and a second plurality of pins generally indicated at 134 which connect the hybrid circuit through a flexible cable 135 and connector 136 to the external circuitry. The construction and operation of the other actuator and head assembly (B) is the same as that shown in FIGS. 3 and 4 except that the head positioning is located within the bracket hole, aperature 138, with the head spring being fastened at 139 so as to be positioned more in line with the axis of the actuator arm at 140 so as to position the head in zone A. The head location at 128 positions the head in zone B.

FIG. 5 shows the track arrangements which are provided with the dual actuator system of the present invention. Thus the disks are divided into inner and outer zones also labeled A and B in conformance with the actuator labeling. Each of the zones contains a plurality of tracks labeled from track A0 to track A826 and trck B0 to track B826. The actuators pivot to bring the heads into positions on the various tracks. It should be noted that the tracks are specified by the head position of heads 126A and B.

Each of the actuators is operated independently, access is only a single zone on the disk, either inside or outside, and is positioned in a non-interfering manner with respect to the other actuator and contains means for defining its own track orientation and location by reference to the servo disk. Additionally the heads need not be specifically aligned with respect to each other for they are positioned on a plurality of actuators which always maintain the same relative position. Accordingly, even though the heads may be slightly mislocated they nevertheless define a "cylinder" in space on which parallel data is to be written. All of the heads which are employed for reading and writing data are operated in parallel and as will be explained it is sufficient in this application that a parallel data stream of five words be used. This capacity is found adequate to record video signals of substantial bandwidth in real-time. The heads are operated alternately on successive video fields, one head being in a search mode for the next available track while the other head is writing or reading from the track to which is has been located. Thus, the present invention by using independent amplifiers and independent read/write signal channels operating in parallel, possesses the ability to access all of the multiple heads simultaneously of either channel A or channel B. The use of five channels follows from the need for a very high input/output transfer rate to be achieved. Thus, each channel is operated at about three times the conventional disk data rate and since there are five operating simultaneously, a net 15 times greater transfer rate is obtained than is conventional. In addition from the foregoing discussion it is seen that the data in the present invention is physically synchronized depending solely upon the positioning information from the servo disk. Moreover the above is achieved without the need for elaborate external controllers and extensive data buffers, since in the present invention the required functions are built into the operating circuits disclosed. Furthermore, the heads are in close proximity to each next destination track, it is possible to obtain adequate speed of movement of the head assembly in the time of one video field so as to reposition a head and transfer the data stream without significantly interrupting the data flow. If an attempt were made to achieve this with a single head assembly, the required computation movement would have to be sufficiently rapid relative to a rotation period as to avoid data flow interruption. This is not believed possible.

The present invention is thus characterized as a two sided machine having one portion and one actuator set going through one part of the cycle and the other in the other part of the cycle. It provides for cotinuous real-time recording and also allows for error correction of media flaws by allowing a sufficient time to search a map of track flaws, a determination to be made of the next track available without a flaw, and time to move to that track.

The foregoing is accomplished by the use of flaw map memories and a track skipping algorithm for bypassing flawed tracks. Preliminary to using the algorithm and at the time of manufacture of the video recorder a careful investigation is made and an address of each track having a flaw is recorded in a suitable memory. Thereafter, the sequencing of memory addresses includes the algorithm for checking the memory flaw map and for re-computing the next available flaw free track to which the respective arm assembly is directed. This is accomplished as an internal operation of the recorder and therefore is transparent to the user.

Dual Actuator Control Subsystem With Track Skipping

The dual actuator control subsystem controls the movement of the two head positioners in response to a set of sequenced commands from the external controller. Each rotary actuator is positioned to the desired cylinder location using a conventional voice coil servo system based on pre-recorded reference tracks on the servo disk.

This method incorporates and utilizes the feature of two independent actuators controlled by the same electronic system, operating in a ping-pong fashion and programmed in the controller such that they will skip over tracks or cylinders which have media defects located at the time the system is initially manufactured and tested. Rather than using information that is stored on the disk digitally in each sector to indicate the usability or nonusability of the sector based on media errors, the present invention prestores the address locations of media defects and the controller is used with an algorithm to automatically convert incoming addresses to new addresses which are associted with the useable locations on the media.

The main advantage of this technique is that it eliminates the burden on the external control system of maintaining good and bad sectors on the disks and good and bad cylinders. Normally, a computer system would require the user to read data from the disk which contains the information as to which sectors and which tracks have media defects. The host computer system, once having that information, would have to do its own programming in order to utilize only the good sectors. Many times what is done, in addition to that, is that the errors and the data that are encoded in the errors may be detected and possibly corrected by decoding the data in the main computer. For the application of the system as a video recorder, the time involved in doing the error detection and avoidance would be excessive for real-time data processing. Therefore the invention employs a new scheme to do that function using two actuators and using a track skipping and mapping algorithm which eventually makes the media error totally transparent to the outside user, so that as far as the user is concerned or the external controller device is concerned, the disk is error free and this system appears error free.

The method includes a step of going through the whole disk to check it out and establish those addresses which must be eliminated. During the initial testing and qualification of the unit, a computer driven test is done which involves all of the possible locations and all the possible cylinders that are usable in the system for recording. And those which are producing data errors are detected and logged by the computer system and stored in a table of flaw maps (Proms 305, 306). That stored table is then used to generate a file which goes to the PROM programmer which automatically creates a program of stored media eror locations which the actuator control system utilizes in its track skipping algorithm. This device, which is an integrated circuit chip, programmable, read-only memory, is programmed for each of the units that are manufactured and that becomes part of the unit before it's shipped. Once the Prom is installed in the unit, the unit will automatically skip the known and listed media defects.

The operation and construction will be better understood from a review of the way data storage is handled. Digital data is stored on a one field per revolution basis. Each field (or half frame for interlaced video) is stored on one five-track "cylinder." Each actuator (head positioner) can access one of 826 five-track cylinders per field time. The two actuators operate independently and do not access the same set of cylinders; thus a total of 1652 fields of data can be stored in a single disk unit. (assuming no media defects) For interlaced video, odd field data are always recorded on the outer data recording zone by Actuator A, and even field data on the inner recording zone by Actuator B. For progressively scanned video, half frames are alternately recorded on the cylinders of the two recording zones. While a cylinder of data is being recorded in zone A/B, the Actuator A/B is held in the closed loop tracking mode while Actuator B/A is stepped to the next cylinder address. Thus, the cylinders are accessed in a ping-pong fashion at up to the video field rate during real-time recording of successive video frames. FIG. 6 shows a track scan data line and an enlarged segment thereof.

Actuator movements are commanded at the beginning of the vertical sync interval by the external controller. Up to one disk rotation period is allowed during real-time recording or playback for stepping and settling of an actuator. During this period, both the handshake transfer of such information and the actual positioning of the actuator to the desired cylinder address must be completed. By controlling the synchronized actuator command sequence using software routines in the external controller, a large number of video playback modes are possible, including slow motion, fast motion, stop action, slewing, looping, toggling and random frame access.

Figure 7:
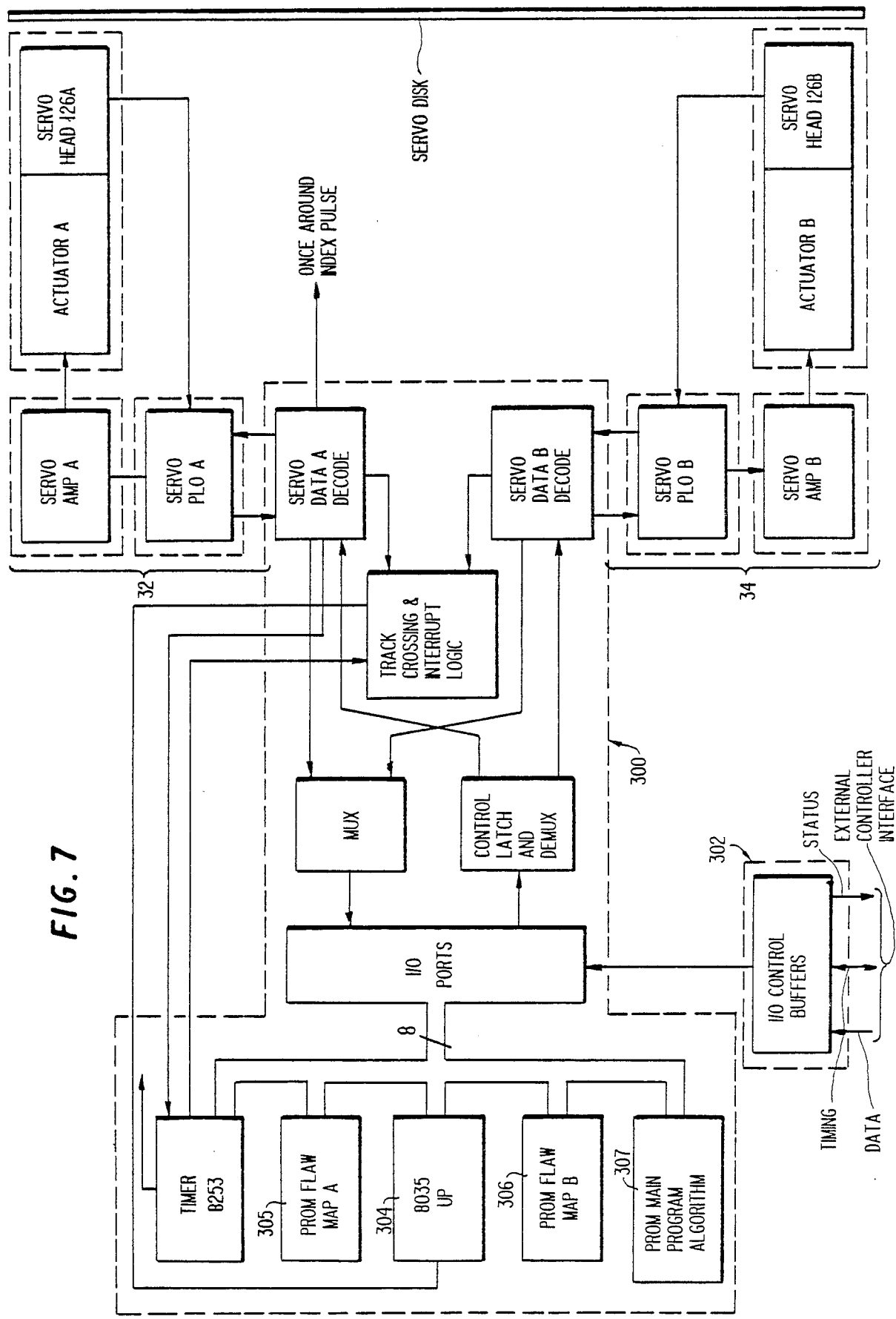
FIG. 7 is a circuit diagram of actuator controller and asociated electronics of FIG. 1.

A block diagram of the Dual Actuator Control Subsystem is shown in FIG. 7. It contains a single 8 bit, 8035 based micro-processor servo controller 300, the two servo loops 32,34 and voice coil current drivers 10,12, and I/O control buffers 302 which interface to the external controller. An architecture using a single uP 304 to control two actuators was chosen to simplify the control interface, save logic, and to reduce the demand on the power supply subsystem.

Also contained within the uP based controller are two custom Proms containing flawed track information. This feature enables the actuator control system to automatically step over known media defects. Since the handshake transfer with the external controller consumes 2-3 msec, approximately 14 msec are available for modifying the track address (to skip media defects) and complete the seek operation for 60 Hz video. Therefore, the actuator control subsystem should be able to step over 5 defective tracks (i.e., a 6 track seek), in real time, using an algorithm that takes no more than 3 msec to modify the track address. The mapping algorithm developed is a ripple forward routine.

This concept does not requires the external controller to have knowledge of flawed tracks. Real time recording is accomplished by simply incrementing a track address counter each frame time.

Figure 8A:
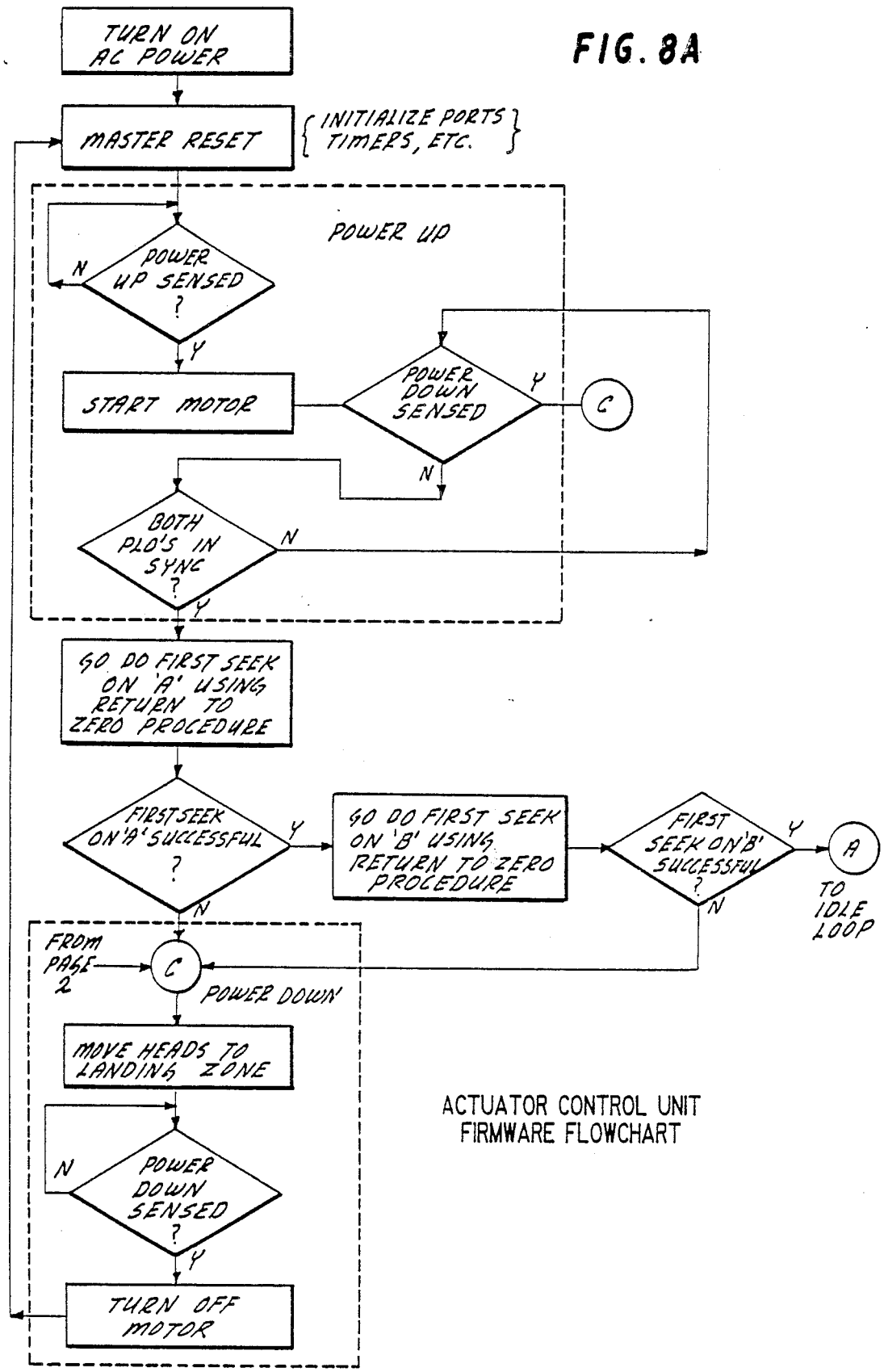
FIGS. 8A–8C is the actuator control flow chart.
Figure 8B:
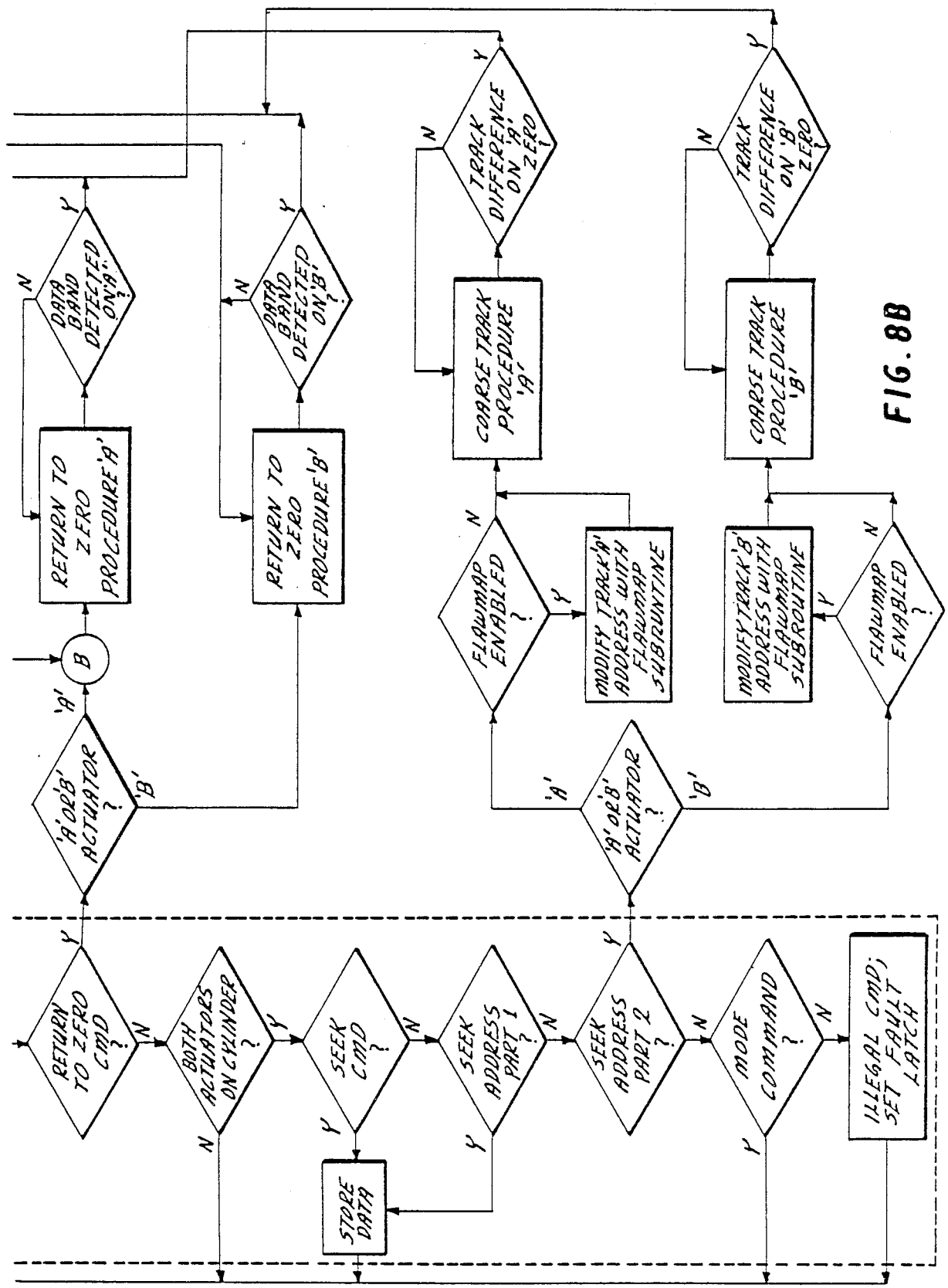
Figure 8C:
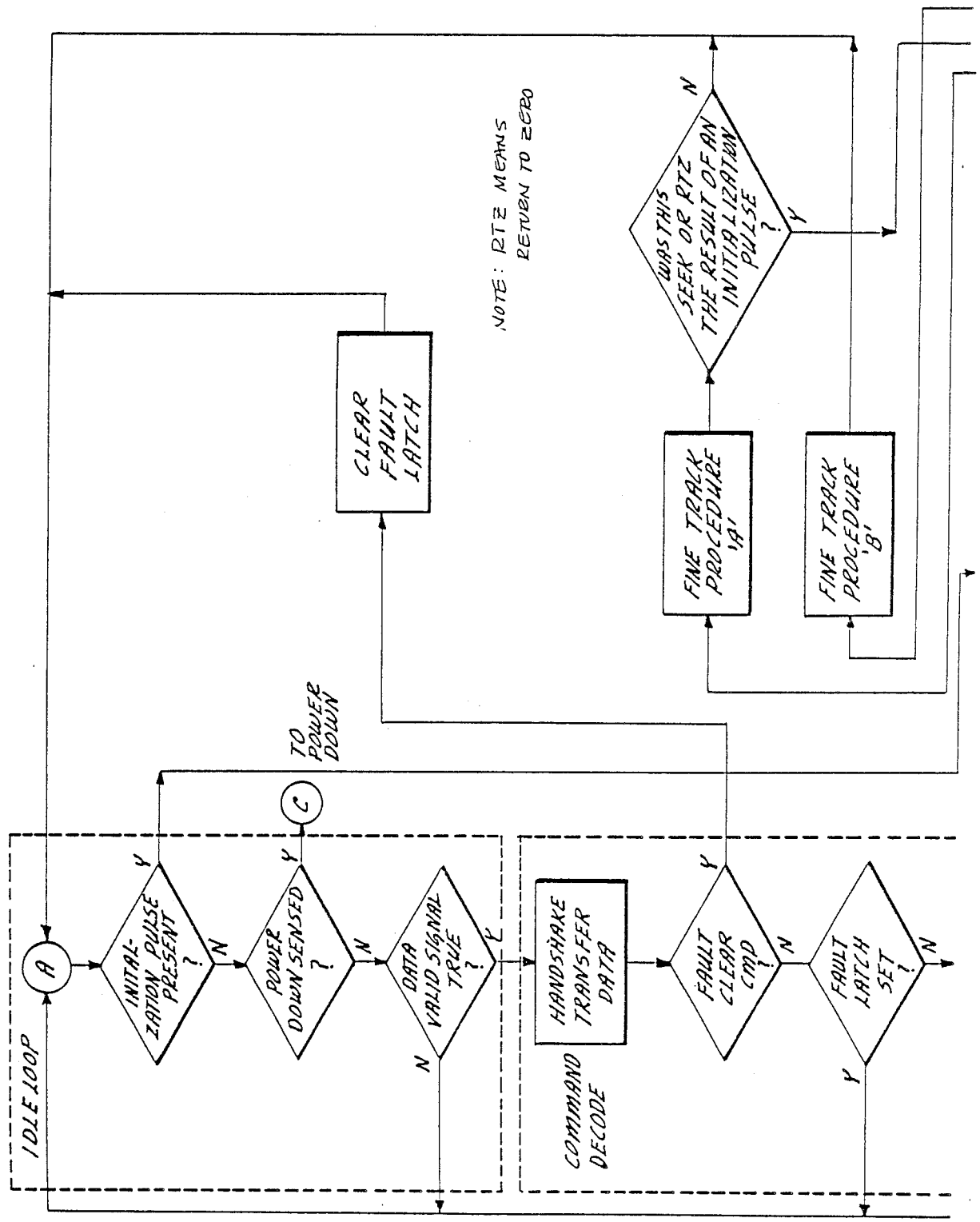

FIGS. 8A, 8B, and 8C form a logic flow chart for the operation and includes flaw map check. FIG. 9 is a logic flow chart for the flaw map subroutine and is implemented in practice with a suitable algorithm.

FIG. 9 is a flow chart of the track skipping algorithm. The algorithm follows the following procedure:

1. The initial address to the bit in the flaw map memory is located from the CPA.
2. The difference, either positive or negative, between the DLA and CLA is computed.
3. The process begins with determining (in the direction of DLA/CLA difference in the flaw map) if each inclusive location is flawed.
4. The difference is reduced for each encounter of non-flawed track. The physical track is always adjusted for every processing loop.
5. The final physical location is reported back to the mainline program.

It should be noted that this invention records data on one revolution of the disk per field time of the video signal. The head positioner system (A) or (B) during one field time, moves one set of heads on a given positioner to a predetermined track for either recording or playing back data, while during the same time, the other external controller is communicating to the microprocessor 304 in the actuator control system information which that particular actuator needs to be positioned. During any given field time, the recorder must accomplish three things: it must complete the handshake transfer of information between systems, allow sufficient amount of time to modify the track address of the interface, in other words, go through the algorithm and take the incoming track address and change it to skip over the defects, and, then, finally allow sufficient time to do the actual movement of the head positioner.

To complete the handshake transfer of information between the microprocessors 304 and external takes about 2-3 milliseconds. In a 60 hz field rate application, one revolution in the 60 hz application is 16⅔ milliseconds. If 2 to 3 milliseconds is needed in communicating information back and forth, that leaves with 14 milliseconds to complete the seek and modify the track address if appropriate. During a given field time, one actuator is on-track and the microprocessor has nothing to do with maintaining it on-track. The servo positioning electronics holds it on-track. The other actuator now is under control of the microprocessor based system and it's going to also move during that field time of 15 milliseconds.

If a plot is made of the track address difference versus seek time is made, a 6 track seek will be found to require about 11 milliseconds. That means that there are approximately 3 milliseconds available to modify the track address due to the algorithm. So an efficient, real-time algorithm that can modify the track address and still allow sufficient time for the positioning operation to be complete. In addition, the algorithm needs to be ripple forward so that any tracks that are defective will force all other tracks at the interface to move further ahead. This is shown by FIG. 10. In this example, is track 2 and 3 are defective, anytime track 2 is present on the interface, the internal system will go to the fourth track. Consequently, track 3 would map into 5. This opposed to say, keeping a band of tracks at the end and always jumping to the band at the end whenever a defective track is specified.

This concept is importantly different from the conventional approach to doing a similar thing. The fact that this involves dual actuators and the track skipping algorithm makes it amenable to very simple implementation with a low cost microprocessor which is able to do the function in real time. It provides for the automatic skipping media defect areas without interrupting the real time operations of the disk systems as opposed to what might be done with other conventional computer techniques which would involve storing the locations of the bad media sectors and bad bits, etc., in the data itself on the disk, the controller would have to have on storage at all times in order to make the decision as to whether or not to use a given location or whether or not to remap a desired address into another one that is of known good media. So this system allows you to eliminate all of that in the system in place, you have a fairly simple invocation of a direct skipping function. This system takes any incoming address and maps into the different addresses which corresponds to a known good location and it does this for all of the addresses.

The actual defective track information is stored in the two flaw maps A and B, 305,306 the PROM. There is a separate PROM for each of the head positioners. They are completely independent.

Flawed tracks are determined by the computer test during the unit test of the disk system and then that information is stored in the PROM as track addresses of this flaw map. Then when an incoming record request of some sort, the microprocessor calls the subroutine that looks at this information and modifies via the track skipping algorithm and by pulling data from the flaw map onto the bus.

In operation, when the external control wants to communicate position information to the actuator control system, it will put 8 bits on the data bus and it will raise its data valid handshake signal on the timing bus. If microporcessor 304 is not currently busy with some other seek operation it will respond to that data valid line of the timing bus being active or true by latching into one of its ports the 8 bits on the data bus. After it does that, it will raise its handshake signal back, called data acknowledge. When the external controller senses that the data acknowledge line has been raised by the microprocessor in this unit, it knows that the handshake transfer of those 8 bits is now complete. It can then go ahead and remove the data from a bus and take its data valid line low. Now, to accomplish a seek operation, three information commands are required. The first time indicates a seek operation is requested on positioner A or B; the second bit of information are 5 most significant bits of the desired track address, and the third bit of information is the 5 least significant bits of the desired track address.

Once the 3 handshakes are complete, the microprocessor will then modify that address based on information that's contained in the flaw map PROMS. It has an algorithm to process at that point in order to say what the outcome is going to be. So it calls up the algorithm and the data from one of the flawmaps. The algorithm itself consists of many bus transfer operations. The algorithm is stored in the main program memory 307. The microprocessor bus structure instruction registers, and CPU fetch the next instruction from the main program. So it'll put that address on the bus. The main program, in response to that address, will put the data that's stored in that program location and the data bus, and the microprocessor will then take that into its accumulator and that code tells the microprocessor itself to proceed, with the flaw skipping subroutine containing the algorithm. part of that subroutine includes, not only taking the address that is buffered through initially, but also includes information from the flaw map. So the algorithm tells it to take a look at the flaw map memory and check things out, comes back, does the computation and computes the new address the end result.

The algorithm maps them in a certain order. But in any case track 0 will always map into the very first good address on the disk. Track 1 will always map into the next good address. It may be the very next one, it may be 2, or 3 or 4. This principally saves the time it takes to move the arm from place to place. By doing it this way the arm is always ready to go to the next closest good location.

This invention is connected to a host computer or host controller. It is an improvement in the sense that it eliminates the need for and any speed restriction imposed by the host to do the same thing which could render real time signal processing difficult if not impossible. In this invention a single microprocessor is used for the dual head positioning systems and results in a very simple implementation in which one head is going through the command sequence to move while the other one is actually busy writing or reading data.

In summary, the dual actuator control subsystem of the present invention incorporates real time avoidance of predetermined media flaws using a single uP based controller. It provides real time recording and playback (60 hz field rate); simplifies power supply subsystem; saves logic; and simplifies external controller interface.

The internal flawed track algorithm automatically avoids all known media defects; its efficient subroutine allows real time skip of up to five consecutive defective tracks; and is completely transparent to external controller.

It should be noted that when any repair of the unit or replacement of the disk is necessitated, it is returned to the factory to go through this process again for the replacement components. All the information would be stored for each of the units that are produced and sold as to their media defect locations. If, for any reason, a head disk assembly needs to be rebuilt (e.g., disk is replaced), then the system would be completely requalified and the new locations of media defects will be used to generate a new PROM and the new PROM will be installed in the unit that goes back to the customer.

Digital Spindle Speed Timing Acquisition and Phase Control Subsystem

The servo system circuit for controlling the spindle speed and the spindle phase is shown in the block diagram and includes a spindle rotation phase lock loop labeled 502. This forms a novel digital acquisition scheme for accurate phase lock of the spindle control system.

The function of this device is to position the prerecorded index on the servo surface of one of the disks on the spindle very accurately with respect to an incoming synchronization signal which is called Frame Sync on the block diagram (FIG. 1). The frame sync signal is basically the signal from the external video processing system into the disk recorder and carries the information that allows the disk to phase lock. It is a once-around timing precisely to the signal with an accuracy, in our case, better than one microsecond timing error. The function of the spindle rotation phase lock loop is to provide a digital reference frequency to the switching amplifier and controller which maintains and rotates the phase of the spindle to the correct location, to the correct timing alignment, with the external signal. It does this without affecting the phase lock servo action of the motor controller itself which is synchronized to the tach signal prerecorded on the servo disk. The difficulty, in general, is to provide accurate tach information as to the position of the spindle back to the control system and to be able, with simple circuitry, to rotate the position of the spindle very slowly to the correct position, to detect the correct position, and to maintain it from that point forward. So the function that does that is the digital acquisition system of the spindle phase lock control shown in greater detail in FIGS. 11 and 12.

Figure 11:
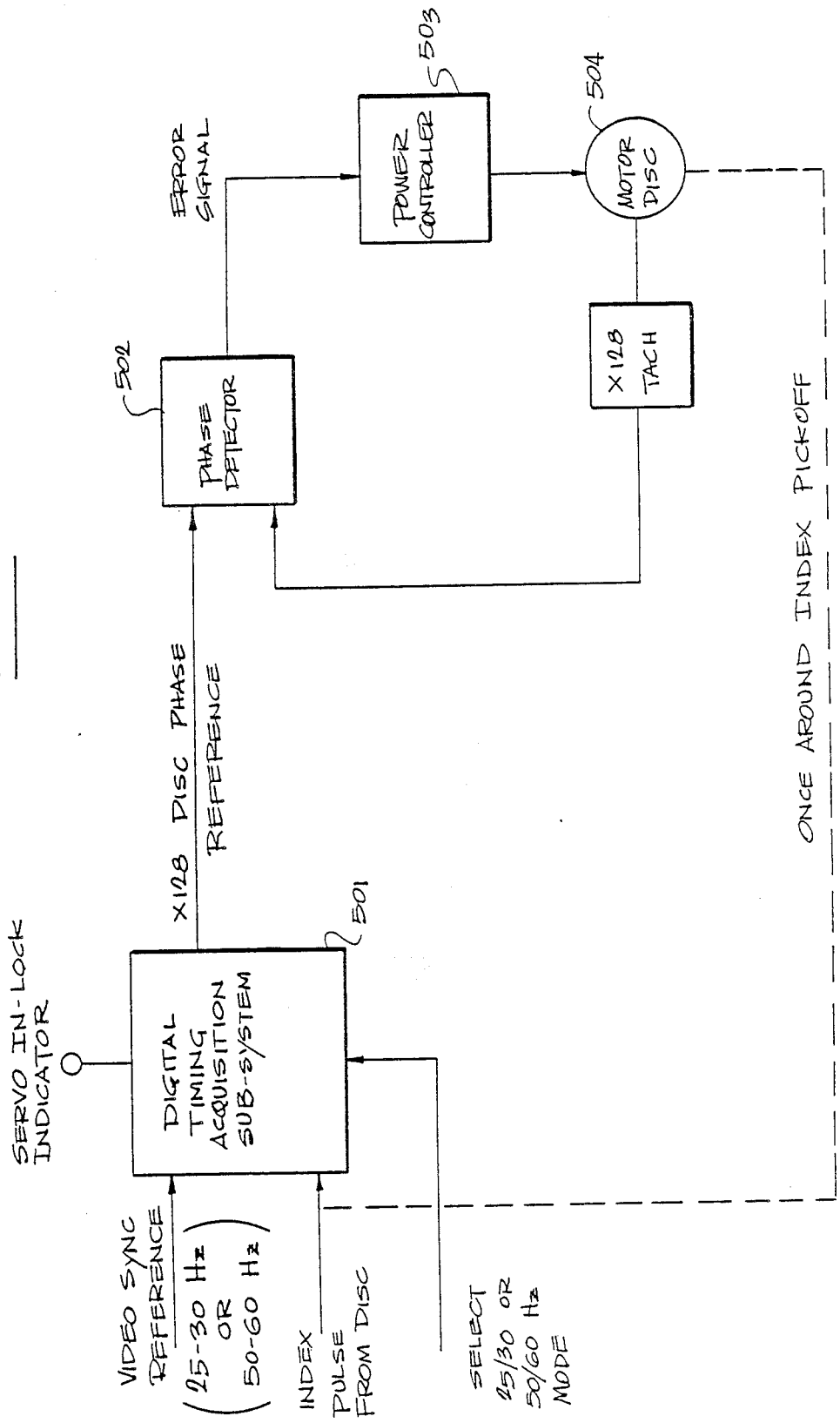
FIG. 11 is a circuit block diagram of the spindle phase lock loop control of FIG. 1.

Thus, referring to FIGS. 1 and 11, means are provided for digital timing acquisition or spindle phase lock 36 on the overall block diagram of FIG. 1B, and called out as the spindle rotation phase lock loop. There are two parts to the digital timing acquisition system, one is the digital acquisition logic and the other is the in-lock detector. These parts form a subsystem which is used in controlling the precise phase lock of the spindle with respect to incoming video sync timing for the digital video disk recorder. This system will also apply as well to any other spindle or motor synchronization system involving a servo where there is a requirement for precision phase lock of an incoming reference signal and the once around index of a spindle.

Figure 12:
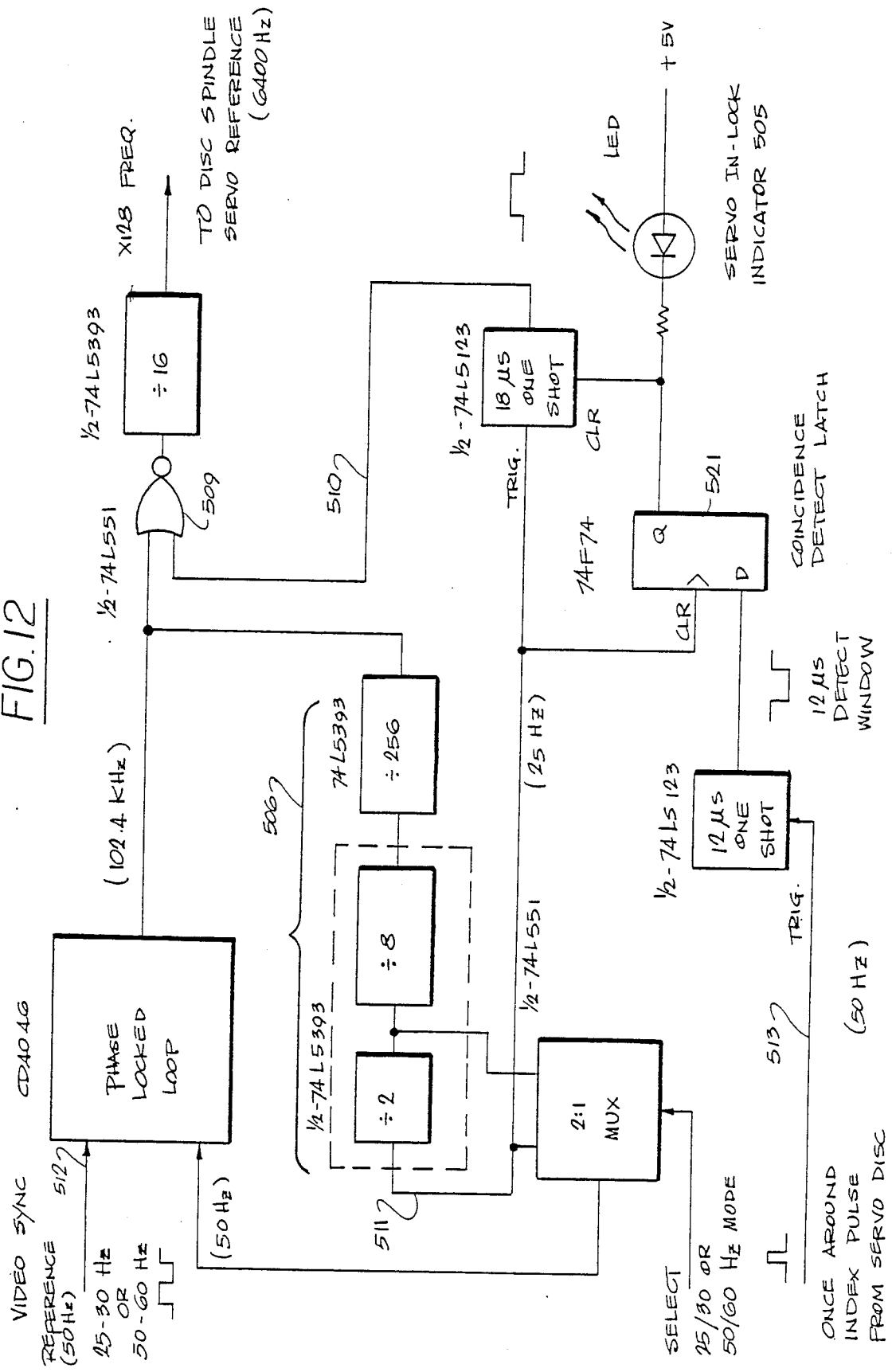
FIG. 12 is a circuit block diagram of the digital timing acquisition subsystem of FIG. 11.
Figure 13:
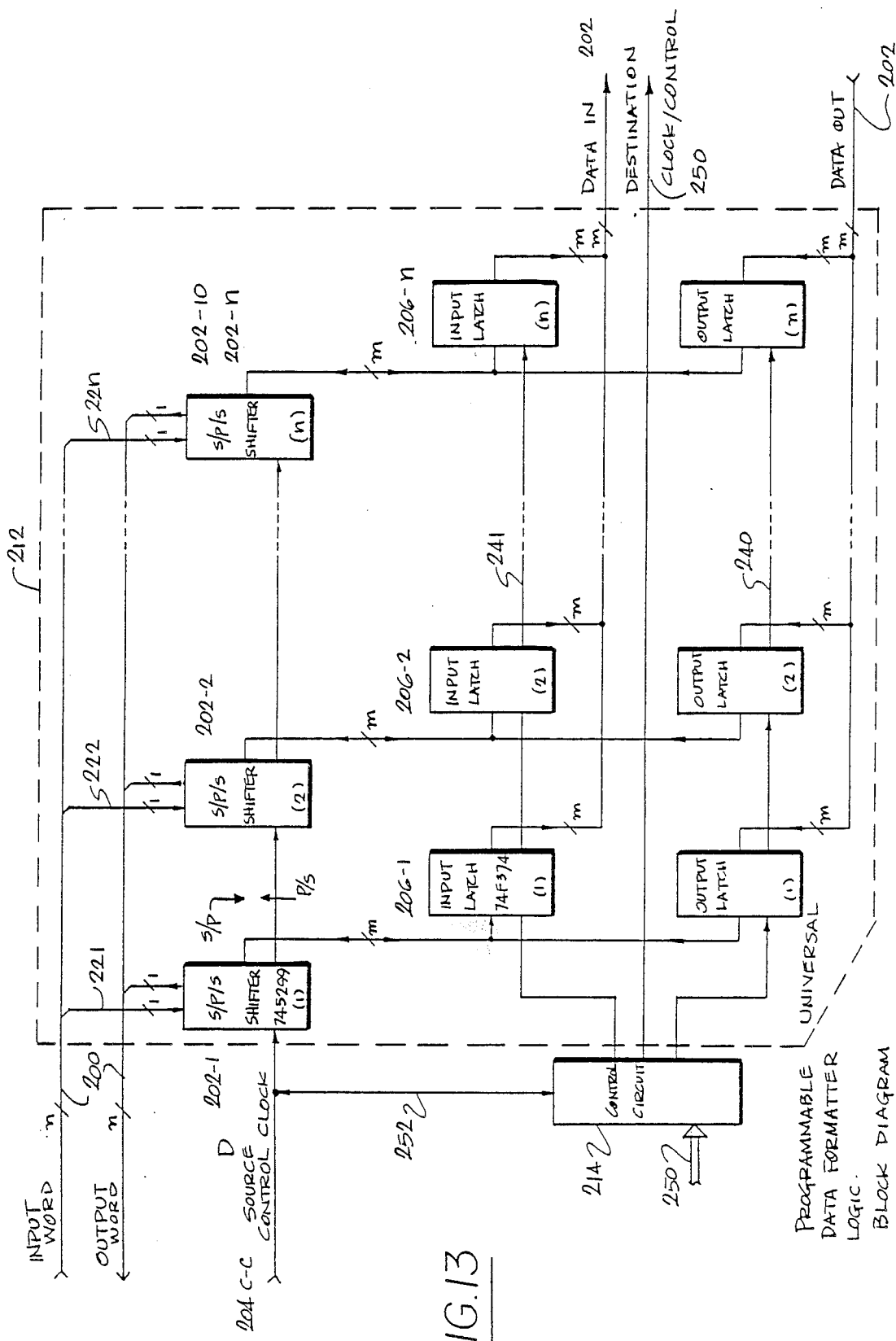
FIG. 13 is a block diagram of a word formatting circuit of FIG. 1 and constructed in accordance with the present invention.

Referring now to block diagrams of FIGS. 11 and 12, the details of the spindle phase lock control and the subsytem for the digital timing acquisition are shown. In order to understand the operation, it is necessary to look at th overall spindle control system. Included in this system are the timing acquisition subsystem 501 and the phase detector 502 and a power controller 503 for the motor 504. This system motor 505 is provided with a disk connected to it and from the surface of the disk from which is derived the (times) 128 tach, tachometer that has 128 pulses per revolution and also a single unique pulse per revolution which is the once around index signal. The object of this system is to control the speed of the motor in the disk very precisely such that the once-around index signal exactly phase locks to the incoming video sync reference. For this implementation, the video sync reference may be selectable in a range of 25 to 30 Hz or 50 to 60 Hz corresponding to different video applications. The motor and the disk always operate at the 50-60 herz frequency available to the system. The object is to control the motor and disk speed very precisely such as to achieve exact phase lock between the incoming reference and the once around index pulse.

When phase lock is achieved, there is servo in-lock indicator 505 comes on to indicate that the system is locked up. The particular spindle phase lock control system depicted has a control loop for speed control which is a phase lock loop. This involves a phase detector whose inputs are operating at a frequency times 128 the disk rotation. This phase lock loop, when the system initially turns on, will lock up one of the 128 possible phases of the times 128 tachometer feedback signal. Therefore there will be a phase ambiguity with respect to the index of 128 possible phase positions, since the incoming video reference is multiplied by a factor of 128 and fed into the motor speed control loop. Thus, it is necessary to have a digital acquisition subsystem which, once the inner speed loop is locked up, will, in effect, rotate the disk to the correct phase such that the once-around pulse of the disk lines up exactly with the incoming video reference. The reason that the phase lock loop of the motor and the disk subsystem is closed at the higher frequency is to provide more frequent feedback information to the phase detector in order to provide the capability of wideband servo control which is required to maintain precise speed control. So therefore, the motor phase loop itself must operate at a higher frequency than the once-around frequency. However, it is required, in many applications such as this, to phase lock the loop to the lower frequency incoming signal, which, in this case, is the video sync reference signal.

We now describe the actual process of digital timing acquisition which is implemented by the digital timing acquisition subsystem. Basically, the object is to rotate the disk around to the correct phase once it has achieved lock to one of the 128 possible pulse positions of the disk reference phase signal. It is necessary, therefore, to modify the frequency or the number of pulses going into the phase detector of the motor speed loop such as to advance the phase of the motor and the disk relative to the incoming signal until the once-around pulse is coincident with the incoming video sync. Thus, we provide an acquisition circuit that provides a frequency offset by phase incrementing the signal to the motor control loop and a coincidence detector circuit which monitors the relative phase of the once around index and the incoming video sync. The frequency is offset under digital control in the acquisition mode until the disk rotates around to the correct position. The correct position is detected by the coincidence detector and then the system is latched indefinitely in the tracking mode and the in-lock indication is turned on.

The circuit implementation which achieves this is shown on the FIG. 12 called the digital timing acquisition subsystem (for spindle phase lock control). This control subsystem contains a separate phase lock loop which serves the function of multiplying the incoming video sync reference by a factor of 128 times 16. The incoming frequency is actually multiplied, for example, from 50 Hz up to 102.4 KHz by the phase lock loop. The phase lock loop has in its feedback path a countdown chain 506 which achieves the correct multiplying ratio. The countdown chain is implemented here by the counters indicated in the feedback path of the circuit. The countdown chain provides a selectable countdown factor of either 8 times 256 or 16×256 corresponding to the 2 cases where the video incoming video sync references is either 25 Hz or 50 Hz. So if the system is in the 25 Hz mode, the feedback counter provides an additional divide by 2 stage to provide the correct phase lock loop feedback frequency. The frequency generated at the output of the phaselock loop is precisely 128×16×the frequency of the incoming video sync. It is also precisely therefore 16×the frequency of the tachometer feedback frequency of the disk system itself.

In order to modify the frequency being provided to the disk subsystem phase detector by a very small frequency offset and achieve the rotation function for acquisition, the output of the multiple phaselock loop is augmented by a pulse which inserts an additional pulse into the clock stream at regular intervals in order to make the average frequency offset by a small amount. This is the technique which causes the phase rotation of the disk relative to the incoming video sync reference. The pulse originating from the one shot portion of the circuit causes the actual frequency of output pulses to the disk spindle to be slightly decreased because the signal at this point, the one shot signal, has the effect of deleting one of the clock pulses into this counter every two revolutions of the disk. The clock at 510 deletes one of the incoming clock pulses from the phase lock loop. Effectively whenever the pulse input is high for a period of time, the "OR" gate 509 forces the output of this gate to a zero so that the counter will stop counting that particular pulse interval. The net effect is, since this is divided by 16 counter, is that the phase jumps by 1/16 of a cycle to the disk, relative to its constant running frequency. So one gets a 1/16 cycle phase increment sent to the disk, relative to its free running average frequency.

During the acquisition process, this additional pulse signal will be activated and will delete a clock pulse every 2 periods of the video sync reference. So if the incoming video sync reference, for example, is fifty hertz, the pulse will be present at this point labeled 510 at a 25 hz rate so every 50 milliseconds, that is, every 40 milliseconds which corresponds to 25 hz rate, there will be a pulse deleted from the pulse stream that's coming into the counter. That has the net effect of changing the frequency very slightly. In fact, the frequency is changed in effect by 1 pulse every 40 milliseconds of the 102.4 khz which corresponds to something on the order of 2 hz.

A flipflop 521 is provided as a coincidence detect latch. Every time a new acquisition cycle is started, the flipflop is clocked; it's an edge triggered flipflop, and it looks for the presence of the once around index pulse at precisely the same time the video reference ocurs. The output of 511 essentially is in synchronism with every other video sync reference edge on 512. And if the spindle is in the correct phase lock, it will also be synchronous and coincident with the once-around index pulse 513.

So in effect, every time this pulse occurs on 511, the coincidence detect latch does a detection operation and it looks at the coincidence detect window which is activated by the once-around pulse. If the edge happens to line up with the coincidence detect window, then this latch will be set to the low state. If not, then it will be reset to the high state. Otherwise it will remain in the high state because the D input is normally high. Therefore, if the phase is the incorrect phase and the pulse is not coincident with the incoming sync as mentioned, the latch will always be in the high state (or acquisition mode) and the additional insertion pulse will be enabled so the frequency will remain offset to the disk spindle system. Therefore the disk will remain rotating at a very slow precisely determined rate until the once-around pulse which controls the detect window lines up with the video sync reference. When that happens, then the latch clocks to the low state indicating coincidence between the once-around and the incoming sync. When that happens, the acquisition mode is turned off, the one shot which is producing the offset frequency is turned off and from that point on the disk is running in exact in the same phase as the incoming signal. The latch also controls an LED in a very simple manner which indicates that the servo is in lock.

Particular claims, features and advantages of this circuit, include: it is essentially fool proof in performance and also a very simple implementation compared to the previous art which has required quite a few integrated circuits and in some applications a fairly elaborate microprocesser with software in order to determine when the system is digitally locked up. It requires only 6 integrated circuits with present off the shelf technology. Those integrated circuits for our particular implementation are indicated here.

The phaselock loop is a RCA CD4046 integrated circuit phase lock loop.

The phase lock loop component such as this has 2 phase detector inputs. One is the reference and the other is the feedback signal which comes from the phase lock loop timing chain. It has one output which is the voltage control oscillator output frequency. So it's a self-contained function, digital in nature except for the voltage control oscillator which requires a capacitor and two resistors in order to determine the oscillation frequency.

Another feature is that the entire subsystem can be implemented on one custom monolithic chip with today's technology. Therefore, virtually the entire control system for the spindle could be put on one integrated circuit at very low cost.

Another feature is that it includes the lock detector function with essentially no additional complexity involved. The lock indicator simply consists of a resistor and a light emitting diode connected to the flipflop involved in the circuit. The detector itself consists of the coincidence detect latch 521, the 74F74, and the LED which is the indicator part of it. Another advantage is that the phase increments using this approach, can be controlled very precisely in 1/16 cycle increments in order to allow the spindle phase lock loop to remain in lock so that it does not see a large phase jump at any point during the acquisition process which could disturb its phase lock characteristics. That's very important, particularly in the large spindles and multiple disk systems where there's a great deal of rotating mass and momentum involved in the spindle. They simply cannot change phase rapidly if the acquisition circuitry should require that. There's just not enough power built into the motor control system to allow that to happen.

Another advantage of the system is that the phase increment rate which is equivalent to the acquisition offset frequency, is controlled digitally and it's limited to a frequency, a precise frequency that's safely within the loop bandwidth of the ×128 motor phase lock loop. Therefore the offset frequency can be tracked without any significant tracking error by the speed control loop of the motor. Another advantage is that the subsystem achieves precise phase alignment which occurs because the system is operating on the edges, leading edges of the incoming digital signals. The video sync and the once-around index pulse such as to precisely lock them together so that there is no resulting steady state phase error involved in the process. The phase is locked to within the mechanical jitter accuracy of the system with zero offset and no drift over time or analog component drifts or errors as in most conventional analog loop type controlled systems. Also the acquisition and the phase control is error free. The circuit is guaranteed to lock up with 100% probability under any circumstance. There are no possibilities of a false lock or locking to an incorrect signal because the frequency offset is so slight relative to the primary frequency that the system can never reach a false lock frequency.

Another advantage is that no adjustments are required for zero phase error. The system is automatically self-adjusting in that respect and is not dependent on any analog voltages or time constants. The system includes a times 128 multiplier which provides high frequency, higher frequency for more accurate spindle speed control. This is required in many systems in order to achieve a high bandwidth in the spindle motor control loop. If the bandwidth were based on feedback information at a once-around index rate, it would be severely limited to a bandwidth which is small relative to the once-around frequency. Here the only requirement is that the bandwidth be small relative to the times 128 once-around frequency which provides a higher bandwidth capability. Another feature is that the circuit does not require external clocks or oscillators in order to operate. And finally, the system as implemented, allows the spindle to be locked to submultiples, any submultiple of the spindle rotation frequency with the phase lock being uniquely determined. That has applications in video systems, for example, where it's desired to lock the video recorder to a progressively scanned television system as opposed to an interlaced television system. In a progressively scanned television system, the video sync information comes in at half the normal rate as it would for an interlaced system. Therefore it's necessary to skip every other once-around index pulse and only lock to every other index pulse.

The lock detector is unique in the sense that it requires very few parts, only one LED, one limiting resistor, and one edge trigger flipflop. Most lock detectors that are used in practice require a filter and a comparator and some kind of latch. And, of course, the filter and the comparator involve several analog components typically. Some of these also require counters in order to count the number of successful acquisition attempts so to speak, or acquisition trials in order to increase the probability of achieving a true lock indication and not be subject to false lock based on jitter or noise in the loop. That problem is avoided totally in this system by means of this implementation because that system only depends on the phase of the incoming signal relative to a 15 microsecond detect window and the phase would have to change significantly at least by a plus or minus 7.5 microseconds in the system before the coincidence latch would detect an error. So it has a built in range over which the phase can change due to residual jitter without causing a false detection indicating that it's falling out of lock. The additional feature of this particular lock detector is that it will detect lock of both the spindle speed control loop in the spindle system and the once-around phase control loop with the same lock detector eliminating the need for 2 lock detectors which is commonly required in the spindle control system.

It also responds instaneously if a phase error occurs. In other words, as soon as a phase error occurs which goes outside the precisely timed detect window, then the indicator will instaneously respond. There is no lag time due to the filtering or the counting process that would be used in a conventional lock detector.

While this summary of the features, featured concepts and claims of the implementation refer to and are numbered to block diagram of a video application, the technique is generic to other types of servo systems which involve the basic notion of controlling the object under control, the servo with a higher rate loop while still maintaining precise phase lock at a lower incoming frequency. And this is sometimes advantageous when it's required to achieve an increase in the control bandwidth of the servo system, even though the incoming frequency is very low. If one were to use a single loop to accomplish the same function, the choices of bandwidth would be highly limited by a single loop implementation and it would not be possible to achieve a bandwidth that approaches or exceeds the bandwidth of incoming frequency. This is possible with good precision with this digital phase lock control approach.

Another type of instrumentation that could be controlled by this timing acquisition subsystem includes all electromechanical devices which involve a motor whose position has to be controlled in phase relative to an incoming command and it would also apply to phase lock loop applications which do not involve a motor at all, but involve a relatively wide bandwidth requirement in the phase lock loop relative to the incoming frequency. An example would be a taperecorder whose reel motors have to be controlled accurately in phase. A scanning device whose signal processing chain has to be phase aligned to the actual scanning mechanism.

The digital acquisition logic just described provides very simple implementation, can be implemented on one custom monolithic chip, and includes lock detector function with no additional complexity. It increments phase in controlled 1/16th cycle increments to maintain $\times 128$ spindle lock, the phase increment rate (or acquisition offset frequency) is controlled digitally and limited to frequency safely within $\times 128$ motor phaselock loop bandwidth, and achieves precise digitally controlled phase alignment. It is error free and provides guaranteed lock-up with 100% probability. No adjustments are required for essentially zero phase error. It includes $\times 128$ multiplier for spindle speed control with relatively large bandwidth. It needs no external clocks or oscillators and allows locking to submultiples of spindle rotation frequency with unique phaselock.

The lock detector requires only LED, limiting resistor, and one edge triggered flip-flop for implementation and detects lock of both spindle speed control loop and once around phase control loop. It responds instantaneously if phase error occurs (goes outside of precise timed window).

Biodirectional Programmable Word Formatter

The function of the word formatter is to convert incoming digital data from a bus whose width may be selectable between 6 and 10 bits into a sequence of 5 bits parallel data i.e. 5 separate data streams that feed each of the 5 digital recording channels continually. The word formatter is a unique digital architecture which allows this to be done bilaterally with a single circuit, both for the recording process and the inverse mode of operation for the playback. Conventionally, this would require two separate circuits and two separate circuit paths. By using the architecture to be disclosed, the same circuits can be used for both recording and playback portion of the process and it can also be programmable with software to accept the format of the input/output data anywhere between 6 and 10 bits in width and change it to 5 bits. The data bus width of the system is made software programmable. As far as we know, prior art data bus widths are fixed and are not changed as a function of the operating mode of the system.

In the input mode, an input word comes in on line 200, each input word consisting of N bits where N can be 6, 7, 8, 9 or 10 bits. Those words are serially shifted in into a set of ten parallel shifters, 202-1, 202-2, . . . 202-N shown as collectively as 204-1, 204-2, 204-N. Thus, N bit wide words get split up into N lines, each line going to one of shifters 202. If one had, say 2 bits, the 1st and 2nd shifter would get something and every other shifter would get nothing. So, a word of N bits length gets shifted in serially, called word serial shifting: each word comes in, word after word, although each bit of each word comes into a specific shifter. After Mry shifts, a set of latches takes everything that shows up in the parallel outputs of this shifter. At the same time that Mry takes into the input system latch 206-1, 206-2, . . . 206-N, so there is no interruption of the incoming shifting of the Ncy words. As used herein "Mry" (pronounced Mary) and "Ncy" (pronounced Nancy) are used as easily identifiable forms of M and N, respectively, and are identical therewith.

Figure 14:
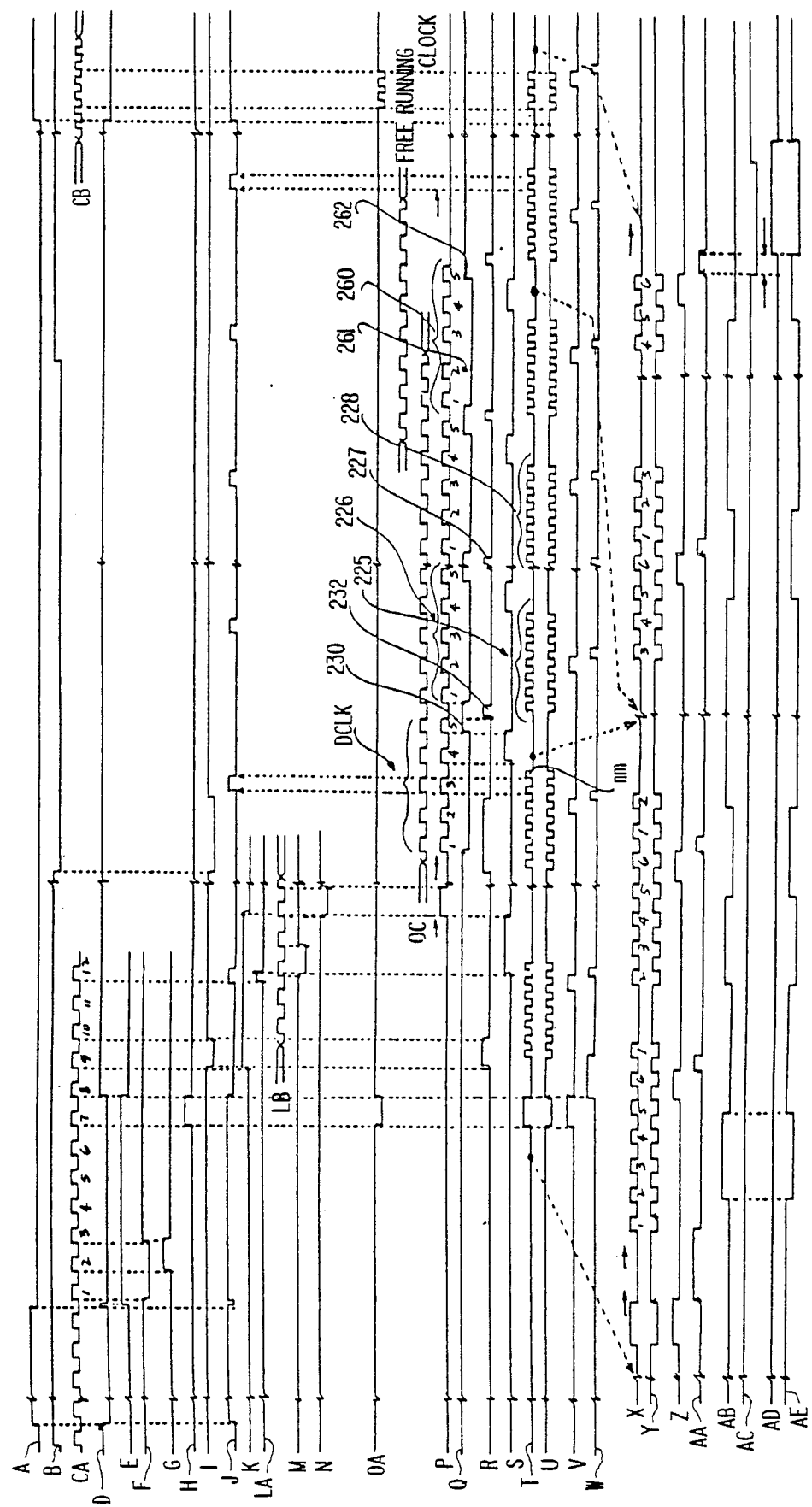
FIGS. 14A–AE are a series of graphs A–AE showing the timing relationship of various signals in the formatter of the invention of FIG. 13.
Figure 15:
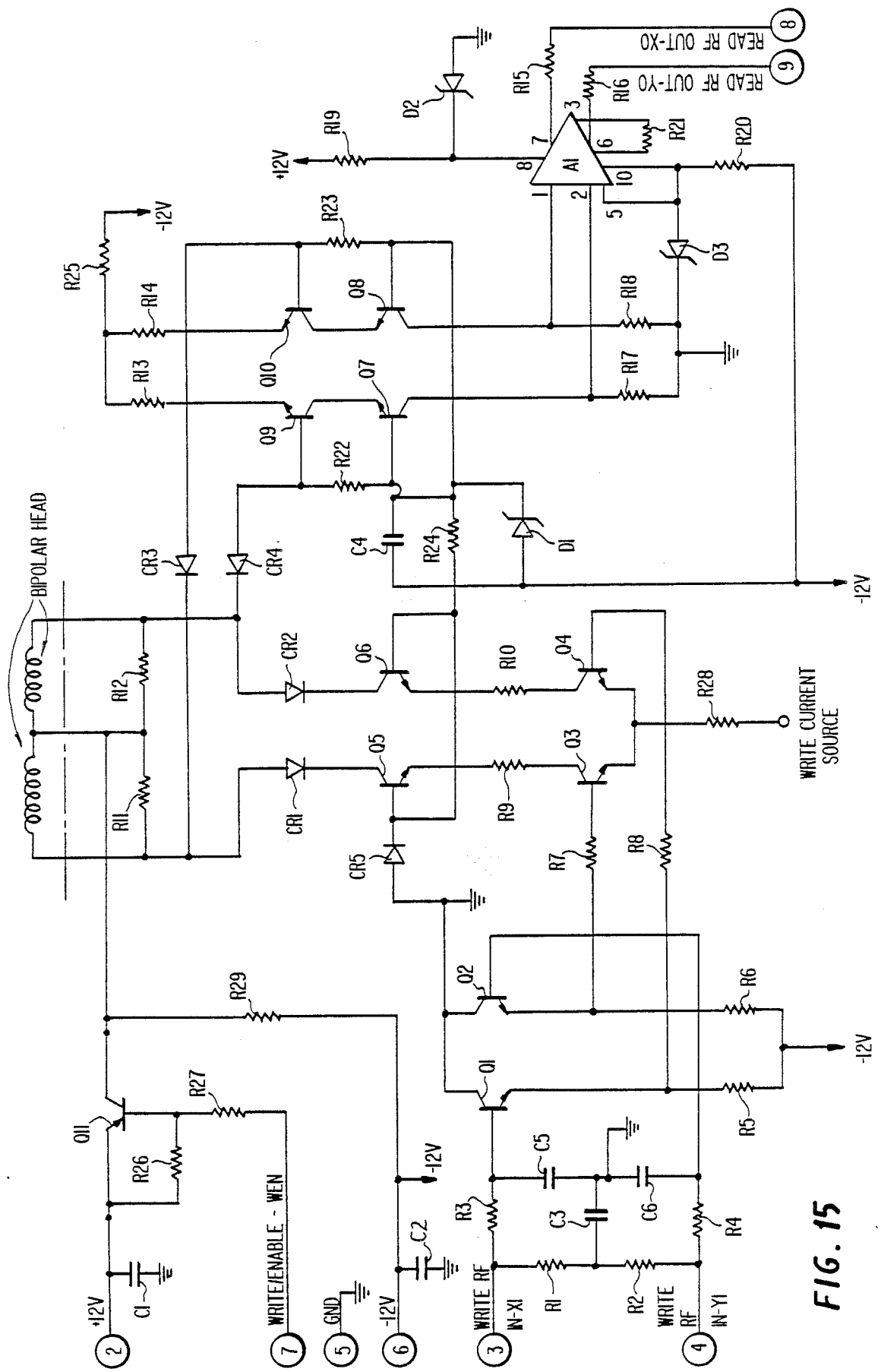
FIG. 15 is a circuit diagram of a hybrid read/write amplifier constructed in accordance with the present invention for use in FIG. 1.

Thus, the input word is of Ncy length and drops into Ncy shift registers where it's stacked up. Every Mryth amount of data, the input latch array is actuated to shift Mry of the data bytes into the array. This is better understood by reference to a digital data format/reformat timing diagram, FIG. 14, and we're looking at those elements which are on OC which is D clock. The shifter clock is derived from the D clock, but D clock can be a continuous clock, whereas the shifter clock D is a burst. This is a reference to the timing signal which is called the blanking signal, V'blank. The shifter clock would be quiescent and nonactive until the blanking signal goes inactive. When it's running, it is synchronously in phase with the data clock itself.

The next signal that's developed is the Mry transfer signal. Refer to the I-Latch clock or ILTCH CLK, which is the actual signal that clocks the Mrys in. The enable is called 2D9 (referring to the IC package), so that during the active low part of the shifting clock itself, the pulse will be generated. After 5 Ncys, Mry signals shift using what is called ILTCH CLK, which takes all the data showing in the parallel outputs of the shifter array into the input latch array. As this takes place, more Ncys continue to keep coming along. As soon as the first Mry is latched in it triggers the control circuit to generate a burst clock. The burst clock is shown in diagram as BBC (buffer burst clock). BBC will clock in the data from the input latch array into the next section, which would be the destination circuitry. At the same time the burst clock will be clocking another circuitry which would generate a set of enables. Each enable is dedicated specifically for each input latch. So, as soon as Mry is latched, the burst clock will enable the first latch, and the clock edge of the burst will clock the data coming out of the latch 206-1 into the destination circuitry. As the burst clock keeps clocking, the following input latch will have its output enabled. Thus, the burst clock first enables an output to be taken from input latch 1 and when that's been taken, it sequences to input latch 2 and sequences down to input latch N. The data count at one time after Mry shifts is five and, immediately the input latch will store a given amount of data at once and then it's turned on to transfer data to the data inline, it transfers all the data it has sequentially. And there is enough time to unload data out of the input latches into the destination circuitry, i.e., next stage, before the next Ncys are ready to be taken by Mry.

At the point that the input latch array takes data from the shift register array all at once, it frees the shift registers so that the next data bit will have a place to go without destroying Mry. The fact that it was emptied prevents it from destroying Mry. After transferring the Mth input latch into the Data In line, one is at the end of the burst at NM, because all the Ncys and all the Mrys are accounted for and used up at that point. After this, everything gets repeated in continuing cycles.

As one can see in the diagram a cycle takes less time than 5 clock pulses. Refer to 225, this amount of time is shorter than 5 shifter clock pulses. The time for that burst at 225 is always shorter than 5 times the number of clock pulses shown by the circle at 226. So, one finishes moving all the data out before the new Mry data stream comes in. So as one goes down the stack, you do things faster so that there is never any crowding. By the time a burst 225 is over, the circuit is just waiting for the next I-latch clock to come along at 227 which would give it a new Mry which would trigger a new BBC at 228.

The triggering sequence will now be described. Everything is derived from the shifter clock which in itself is derived from the data clock. When the shifter clock gets up to 5 shifts, it will trigger enable window 230. Enable window 230 will enable the actual I-latch clock 232, which will take the Mrys. Control circuit 24 forms contains a modulo 5 counter. So that every 5 counts it cycles back to one. The system just described will continue to run on.

However, if there is no data clock, there is no shifter clock and/or if the V-blank is active, i.e., high, there is also no shifter clock and nothing happens. Everytime the blanking signal is inactive, which means data is active, assuming there is a data clock, transfer will take place. If the data blanking does continuously active, nothing will happen, no transfer will take place. All the lines at 202 in the output are available at the same time, so there must be some time sharing or something else is happening. There is a switch in between input mode operation and output mode operation. We just talked about input mode. So the output mode time, the line that is common, a bi-directional bus. You're talking about the Mry line. The Mry lines are disabled on the output latch by being placed into its high state, nondriving by another control signal called the read signal on lines 250. In this application it's a read/write signal. In a general context it could be called forward or reverse. Yes, that would generate control lines, any control line that is required. Generalized control lines are labeled 240 and 241 and they're controlled from the control circuit 214.

The unique features are that it is programmable and bidirectional in a way such that it achieves both those features without any additional increase in hardware. Bidirectionality results from the use of a common input latch system and an output system and shift register together with the buses. These account for the bulk of the parts in this circuit anyway. It is programmable in that Ncy can be large or small. This is useful in many different applications, and different modes of operation. The system might be controlled by a computer to use a different data acquisition and replay mode which would require a different bus. Basically the bandwidth can be programmed, therefore the utilization of bandwidth is available in a disk recorder and can be programmed for different modes that may require a different dynamic range versus sampling range in the system without having to alter the hardware or reconstitute the system. In other words it can be used almost instantaneously in one mode and converted to another mode of operation by simply reprogramming the same existing hardware.

If these circuits are connected as peripherals to an arbitrary computer or controller that gave Ncy as 20 or 5, or whatever number, it could be put into such a system with a simple programming change rather than a massive hardware change. This circuit becomes a sort of universally adaptable memory. In a generalized sense, if one is talking about a storage system or transmission system or something that has a fixed bus width, that is called here, Ncy. It is also called a digital pipe. It would have Ncy byte word capacity capability and if the system has a data source which is Ncy bytes wide, usually the data is, let's say Ncy is less than Mry, usually they fill in the data with zeros or something and the other byte positions are put through the system that way. This invention essentially provides an interface which can be used at either end to convert an Ncy byte bus into an Mry bus and back. Where the variables are programmable, one can therefore interface two different data sources of different bus widths. Or, one can select different bus modes of operation if you have more than one source and try to use the same pipe of the fixed capacity, namely, bits bus width. In the past, this conversion has been limited. It's either done by stuffing in zeros or may be done by repacking the words from Ncy to Mry bytes. In this invention, it is done bidirectionally so one can go from Ncy to Mry and back from Mry to Ncy, where Ncy is variable. This system is very general. Obviously the particular Mry and Ncy that were picked are for a particular system. The technique is conceptually sound for any Mry and Ncy. As a matter of fact, the architecture itself can be changed in logic family type to accept really high data rates because the architecture would be the same. The digital components which make this practical are only recently available, namely, high speed 8 bit shift registers with tri-state outputs.

In the output mode the opposite sequence takes place. Normally during input, the input latch accepts data all at the same time from the shifters. During output mode the output latch accepts data sequentially, one after the other. So output latch 1 would take the first data coming out of the destination circuitry and then output latch 2 would take the next word. And once they are all filled, synchronous to BBC, the burst clock, data will be waiting for the shifter to accept it one at a time. So the opposite operation takes place while the input latch becomes loaded at once and shifted out sequentially. On the output mode, the output latch is loaded sequentially and shifts data out at once and does the opposite operation. This is not identifiable as separate parts on the timing diagrams. The same timing is used for the input latch circuitry. Both inputing and outputing operations are essentially similar and the controls are centralized. The burst clock, for example, is used both as input latch and output latch, the windows enable each input latch are what is used to call data into the output latches, each individually while everything is still slaved to the modulo phase.

Performance features include (1) interfaces the source-formatted data word of N-bit each, typically between 6 and 10 bits, to a fixed M-parallel channels, typically five, data processing destination circuitry; (2) fully selectable to any incoming N-bit word size; (3) "First-In-First-Out" type data flow with stuffing technique preserve data integrity; and (4) during output mode of operation, there is zero time delay on the output word, referenced to the source clock/control signals.

The following combination of architectural features are unique and include internal bidirectional bus to eliminate the need of repeated hardware; tri-state devices to eliminate the need of extra multiplexing hardware; equivalent, reversed hardware operations during input and output modes to allow centralization of control circuitry.

The formatting is modifiable to accept larger/smaller source-formatted words; modifiable to interface to a destination circuitry with more or fewer parallel channels; and adaptable to a different logic type family to accommodate higher data rates.

In function, the data formatter performs basic pipelinning operations: While data which is being received is registered; previously registered data is being sent out. In the input mode, parallel input words of N-bits each are word-serially shifted into a set of "N" S/P/S shifters, i.e., serial to parallel to serial shift registers. For every "M" shifts, the content of a set of "N" input latches is updated with the parallel outputs of the S/P/S shifters. Immediately after the update of the input latches, the outputs of these are sequentially, one-by-one, enabled. This enabling function takes place sunchronous to an internally generated burst clock (214). The shifting and enabling steps take place simultaneously and the enabled data words, each being M-bits wide, are effectively the input data to the destination circuitry.

In the output mode output data words from the destination circuitry, each being M-bits wide, are clocked into one of "N" output latches, sequentially one latch after the other. This takes place synchronous to an internally generated burst clock. As data is being prepared in the output latches, parallel output words of N-bits each are word-serially shifted out of the "N" S/P/S shifters. For every "M" shifts, data from the output latches is parallel loaded into the S/P/S shifters. Immediately after this parallel loading takes place, item (i) is executed again.

Hybrid Read/Write Amplifer

As used herein, hybridizable means an integrated circuit packaging using small transistor chips and capacitor component chips attached to the substrate of the hybrid device. It is miniaturized and made very light. It is actually placed on the actuator arm with the head as shown in FIG. 4 which moves in the disk pack so that drive and amplification are provided right at the point of the recording head without encountering any losses in connecting the recording head through cables to external electronics. While this has been done using monolithic integrated circuits in digital computer disk applications, the unique thing about this approach is that the bandwidth and the current drive capability of the device are significantly increased in this form so that it is suitable for the wideband digital recording that we do and also for other high density recording applications which may be developed in the future such as the vertical recording. And, this invention does not directly relate to the media itself or the type of recording head that is used. It is independent. The type of recording that is used in this video recorder is conventional longitudinal magnetic recording. This new hybrid read/write amplifier device, with its improved bandwidth capability and its improved current drive capability, would also be suitable for the newer higher density, vertical recording systems which have not yet been manufactured and this would be an improvement to what exists presently in the monolithic device area and would be suitable in performance to cover the higher density, vertical recording applications.

Figure 16:
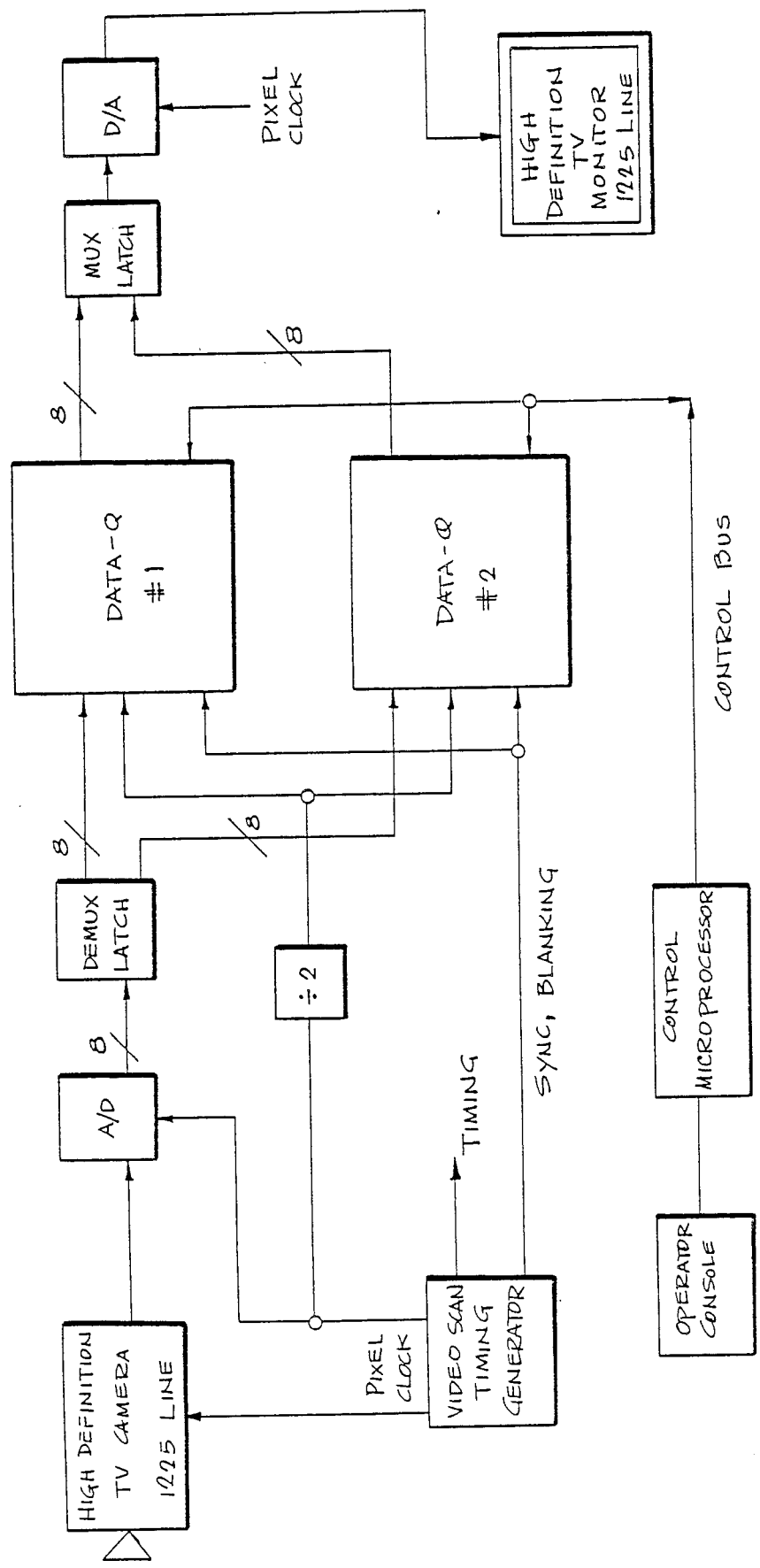
FIG. 16 is a block diagram of an application of the invention to high definition TV recoding.

The Hybrid Read/Write Amplifier as shown in FIG. 16 provides three basic functions for high density recording systems, in a single, small integrated circuit package. It combines the functions of a wideband writing amplifier which provides the current drive and amplification for the head. It also provides a low noise preamplifier for playing back small signals from a wideband recording head. And thirdly, it contains a diode switch which allows a single head to be switched between record and playback very rapidly. The diode switch as compared to other forms, such as a relay, achieves the advantage of very fast switching times between the read and write modes. These three functions are combined with the damping resistors which are commonly used to provide damped response of the inductive recording head, all within a single package which is small enough to be mounted on the moving arm assembly of the disk recorder right next to the recording head itself. The input and output signals are arranged such as to be carried on a flexible cable which has controlled impedance between conductors such as to achieve an impedance match between some remotely located source or amplifier and the device itself. Thus it's possible to run signals over an appreciable distance to the device with a very wide band response on the input and output. The reasons this has a potential advantage over conventional monolithic chips which provide this function in computer systems are that the implementation permits more accurate signal response on the input writing signal path, provides a much wider range of current operation than is achievable in present monolithic devices, and also provides the capability of very low noise amplification at the front end. The main reason for that is that the hybrid is able to use discrete low noise transistors at the input as opposed to monolithic integrated transistors which cannot achieve the required low noise. The device is designed to be implemented using hybrid integrated circuit packaging technology. It actually has been integrated on a relatively small substrate chip and mounted with the head at the end of the arm as shown in FIG. 4. The circuit has been built to occupy a very small area; in this case, an area measuring 0.8 inches per side or 0.64 sq. inches.

A hybrid device shown is composed of an insulating substrate of some kind, usually an alumina wafer or ceramic wafer and upon which is deposited gold metalization layers with thick film deposits for resistors and pads for innerconnection of chips with bonded wires. Devices are bonded down to the substrate and interconnected by a means of a very small wire bond and then the whole device is sealed in a package with the I/O pads protruding for interconnecting to the device. This is known in the electronics industry as hybrid packaging technology. The individual parts are available in what is called chip form or flipchip form which is basically the unpackaged form of the device, whether it be discrete transistor, a diode or an integrated circuit. The chip form of that device is usually much less expensive than a complete packaged device and it's also very much smaller and it can be integrated to a higher level of complexity permit area. It is a hybrid which forms a circuit function of system function. The primary feature of the hybrid read/write amplifier used here is its circuit architecture which allows the same bifilar recording head to be effectively switched between a high current driver on the writing side of the device to a low noise amplifier on the reading side. This is accomplished using a cascode differential switch type of transistor configuration which results in the ability to minimize the output capacitance of the writing amplifier and to maximize the output impedance of the writing device in order to provide a wideband current writing response into the recording head. The measured response of the hybrid chip with low inductance recording heads exceeds 60 Mghz (conventionally available recording heads can only reach as high as 100 to 200 Mghz). That's largely possible through the use of the cascode configuration shown and the RF devices that are used in the drivers. On the read side of the function, i.e., the preamplifier side of the function, we also employ a cascode differential amplifier configuration using discrete transistors. Q7, Q8, Q9, Q10 is also employed. In a likewise manner, this is able to minimize the input capacitance of the preamplifier while maintaining high impedance at low frequencies which is critical for the inductive source such as is associated with a recording head. This combination therefore results in almost an ideal noise figure and input bandwidth for the preamplifier. The output drive from the preamplifier is a balanced differential signal which is matched to the transmission line impedance of a flexible cable at 620 which is interconnected between the chip and the read amplifier electronics associated with the recorder. This circuit achieves a minimum capacitance cascode configuration for both the writing amplifier and the reading amplifier with a biasing scheme and a switching diode scheme which allows the same bifilar head signal to be switched between both amplifiers for the read/write mode.

The writing amplifier scheme is essentially the same as was employed in U.S. patent application Ser. No. 320,620 filed Nov. 12, 1981 in the names of David J. Hedberg and C. Gary Nilsson entitled FM VIDEO RECORDING SYSTEM and assigned to the same assignee as the present application, said application being incorporated herein by reference.

Referring to the amplifier shown in Ser. No. 320,620, the amplifier was configured a similar way to the circuit configuration used here. However, it did not include any of the switching functions between read and write, nor did it include the playback preamplifier which is also part of the overall disclosure for the hybrid read/write amplifier. In other words, the previous configuration only disclosed the writing amplifier, not the switch nor the preamplifier.

Another significant difference is that the previously disclosed (of application U.S. Ser. No. 441,790, now U.S. Pat. No. 4,577,240) writing amplifier involved the use of differential transformer at the input to the circuit which has been eliminated in the hybrid version disclosed in this application. The transformerless input now used allows the circuit to be implemented with very small size in the hybrid package.

The present invention provides an input to the writing amplifier with an active balanced signal directly from an external source which consists of another solid state amplifier, which signal is then split into the balanced source. Here an already balanced differential source is derived from a driving stage (not shown), a flexible channel, and a hybrid connector.

It is a very flexible printed circuit in which the leads are spaced physically at exactly the right spacing to provide a matched impedance to the hybrid circuit itself.

The connector uses a stripline technique providing a controlled impedance pair of conductors that sit with an insulator on top of a conducting ground plane to achieve the controlled impedance.

Another feature of the R/W circuit is that when the chip 600 is switched into the writing mode, the bias current is automatically disabled to the playback preamplifier so that the output of the preamplifier is turned off. This is done simply by switching the voltage at this mode between R11 and R12 from +12 volts, in the writing mode, and −12 volts, in the reading mode. In the writing mode, when the biased voltage is high, the two preamplifier diodes C3 and C4 are back biased and therefore provide no bias current to the input transistors Q9 and Q10. Since the bias current is not present, those two transistors turn off and block the path of amplification from the head to the succeeding stages of the preamplifiers. This automatically cuts off the output. Ordinarily if that stage were not disabled, the signal level is so much higher in writing on the head than it is in playing back so as to overload the output amplifier and any succeeding stages that follow that in the circuit.

Now, when the hybrid is switched to the read mode, then the writing diodes CR1 and CR2 are back biased because the head center tap now switches from a positive 12 volts to a minus voltage and current is pulled back through the bias resistor R29 turning off CR1 and CR2, turning on CR3 and CR4. When CR3 and CR4 are conducting, they provide low impedance between the input differential input transistors Q9 and Q10 which are connected in the common emmiter differential amplifier configuration. A low impedance is provided between the bases of Q9 and Q10 and the recorder head connecting the recording head effectively to the input preamplifier with a low impedance. And the writing amplifier is biased off at that point. In either read or write condition, the amount of capacitance that's seen on the output terminals is very small because the back bias diodes are chosen to be of a very low reverse capacitance design. Also, both of the stages, the writing amplifier output, (Q5 and Q6) and the reading preamplifier input (Q9 and Q10) are both cascode differential amplifier configurations which achieves a minimum output and input capacitance respectively for those sections. This configuration is optimum and is capable of achieving the state of the art. The enhanced suitability of this device for higher density recording, magnetic recording or recording with a transducer which requires the current drive in one direction and the very low output voltage in the other direction. This circuit provides a solution to greatly improve bandwidth capability of the transducer. Applications include the present video recorder using high density magnetic recording on thin film disks and also include future applications in recording high density signals on vertically oriented media. This circuit concept is uniquely suited to the higher speeds required in such systems.

Vertical media are not commercially available as far as is known, but are, at this point, laboratory achievements on which research has been published. In vertical media, magnetic domains of the thin film layer are oriented perpendicular to the surface rather than parallel with the surface so that vertical media can be magnetized with a very narrowly confined field from a recording head such as to orient perpendicularly along a track instead of longitudinally. By doing this, the polarized domains can be packed in much more closely because the self demagnetizing field is greatly reduced. In this way, vertical media extend the inherent packing density of recorded dipoles or transitions.

The following are general specifications for the hybrid read/write amplifier of this invention.

| General Specifications | |
|---|---|
| WRITE AMPLIFIER | |
| Write Current | 50–150 mA p—p adjustable |
| Head Inductance | 3.5 ± .5 μH |
| Output Capacitance | 4 pF (each leg to CT) |
| Output Resistance (Damping) | 275 ohm (each leg to CT) |
| Current Balance (With input −50 dBc or better) | −45 dBc or better second harmonic level |
| Current Rise and Fall Time (Specified Inductance) | 12 ns 10% to 90% |
| Signal Bandwidth (Excluding Load Inductance) | −3 dB @ 150 MHz |
| Limiting Gain (Excluding Load Inductance at 100 mA p—p) | +36 dB |
| READ AMPLIFIER | |
| Nominal Input Voltage From Head | 3 mV to 5 mV p—p |
| Head Inductance | 3.5 ± .5 μH |
| Equivalent Input Capacitance | 6 pF (each input to CT) |
| Equivalent Input Resistance | 240 ohm (each input to CT) |

| General Specifications | |
|---|---|
| Frequency Response (Excluding Source Inductance) | |
| Amplitude | −3 dB 75 MHz |
| Phase | Linear ± 1 ns variation over .5 MHz to 25 MHz |
| Frequency Response (Single Pole Compensation for Head Inductance) | |
| Amplitude | +0 dB .5 MHz to 20 MHz −1 dB |
| Phase | Linear ± 2 ns variation over .5 MHz to 25 MHz |
| Signal to Noise Ratio | >45 dB in 300 KHz BW |
| Equivalent Input Noise (20 MHz BW) | 10 V RMS with inductive source |
| Gain (Differential Into 100 ohm Load) | 34 dB nominal |

Other Applications

The flexible data bus format and fully synchronous interface features of the digital video disk recorder of this invention allow the unit to be easily configured in various applications without significant development costs. For example, by using a common composite sync input from the external video system timing, two or more recorders can be used to increase the transfer rate capability in multiples of 145 megabits per second or to increase storage capacity and recording time in increments of 700 frames. FIG. 16 shows that configuration of two units for real-time recording and replay of high definition 1225 line television images. In this application, two units will accommodate 1024×1024×8 bit real-time recording.

Figure 17:
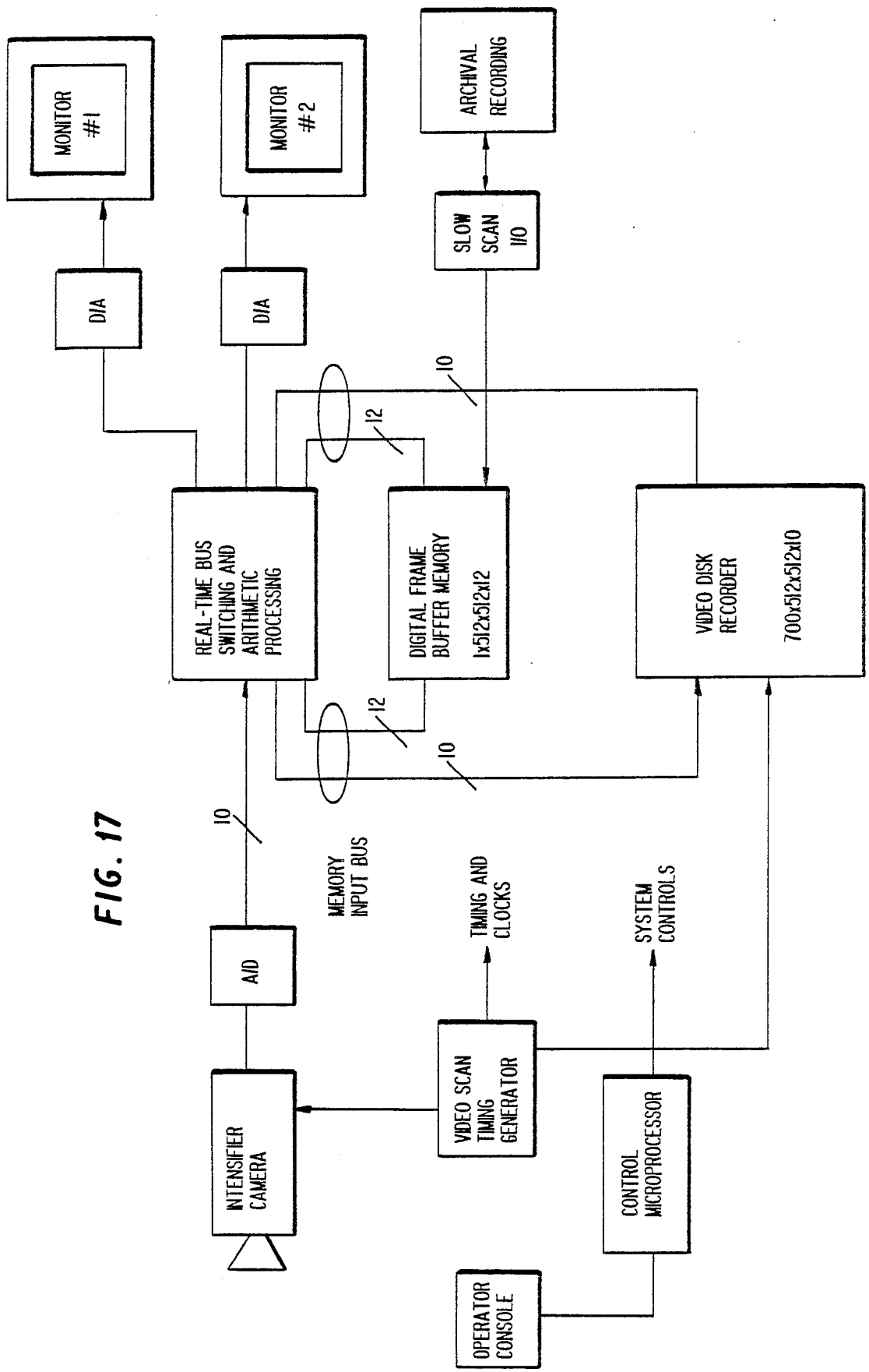
FIG. 17 is a block diagram of an application of the invention as dynamic digital imaging system.

In this way solid state frame grabber type video image processors can be expanded directly using the invention for high capacity, on-line storage and dynamic image processing capability as shown in the dynamic digital imaging system of FIG. 17.

The wideband digitized video data stream from the high definition TV camera is demultiplexed into two digital data streams synchronous data streams operating at each half the digital data rate of the digital stream. These two data streams are then fed to the two video recorders of this invention in the parallel recorders are operated synchronously and capable of recording the two data streams in a synchronous fashion. For playback of the video information the output data from the recorders is inherently synchronous and can be easily recombined into composite data stream using a digital multiplexer prior to D/A conversion in real time display on a high definition TV monitor. In addition to this application of reel time recording from a camera source and display on a monitor it is possible to upload the digital information to the video recorder from another recorder, both of this invention, or, for real time display on the high definition monitor. The configuration described is not limited to two units but can be easily extended to N units by simply demultiplexing the input data stream into N equal rate data streams synchronous data streams. The case shown for two data streams being the special case of the more general case of N. Likewise for playback with higher definition any number of units, let's say N units can be operated synchronously in the N synchronous output data streams can be recombined with the digital multiplexer for reel time display with a single converted data stream.

The video recorders in FIG. 16 are synchronized essentially by connecting them to a common synchronization composite synchronization and blanking source which would be available in the overall system from the video scan timing generator. Also, the clocks which are required for inputting digital data or outputting digital data from the data Q are derived essentially from a common higher frequency clock played by dividing or demultiplexing the clock stream into parallel clock streams operating at half the clock rate (in the case of 2 units) or 1 over N times the clock rate (in the case of N units operating simultaneously). The characteristic of the recorder of this invention is that it operates totally synchronously at its input/output data interface from the external clock which can be derived from a common master timing generator. All synchronization of data transfer internally to this recorder from the disk is managed without reference to the input and output data clock. The result is that any timing errors or timing differences between the two units are effectively electronically removed within each recorder unit by means of its internal input/output buffer memory architecture. The recorders can be easily assembled to operate synchronously and simultaneously for an arbitrary requirement of bandwidth capability or recording time capability.

FIG. 16 illustrates the case of two units used to expand the bandwidth by a factor of 2. Those two units can also be configured to extend the recording time from the nominal 826 frames to 1,652 frames, or, in the case of N units operating synchronously it would be possible to expand the bandwidth either by a factor of N or the recording time by a factor of N or some combination of those 2. In that sense the unit architecture is modular. The applications where this feature could be important would be in for example very high resolution situations such as film making which require digitizing 35 or 70 mm film and storing the digital frames in a large data base, previewing certain sequences of images on high definition monitor for editing composition or special effects purposes. In that case since the digital video disk recorder unit is flexible and its input output format totally synchronous, it is possible to arrange a number of recorders of this invention in the configuration which would handle almost any conceivable bandwidth requirement or pixel frame size that may be of interest in these higher definition applications. It is believed that this is a very significant feature of this invention and permits for the first time very high performance applications to be realized without any significant development work required in the electronic system. One need only use this invention's recorder as a building block module operating either in parallel for extending the bandwidth of effectively in series for extending the recording time. Referring to FIG. 17, there is shown standard digital acquisition and image processing system that would be typically used, for example, in digital radiography X-ray system or other types of diagnostic imaging systems. Basically the function of the video disk recorder system in this application is to provide a large secondary memory capability which is bandwidth compatible with the main digital video signal processing portion of the system. One of the limitations of present systems which use solid state memory devices for frame grabbing and processing video information in real time using a frame solid state frame storage architecture is that the total number of frames that can be stored or used in the processing algorithm at any one time is limited by the size or number of planes involved in the frame buffer memory. By using the digital video disk recorder as a secondary data base memory the number of images that can be involved in a real time processing algorithm can be greatly increased and therefore the number of applications which are available to the system can be expanded. FIG. 17 basically shows the digital video disk recorder acting as a direct secondary memory store for the image processing system which has the same input output bus bandwidth and addressing capability as the primary digital imaging system itself.

We claim:

1. A digital formatter for converting a data stream N bits wide into a data stream M bits wide for use in destination circuitry and for reconverting said data stream from M bits wide to N bits wide when received back from destination circuitry, where M and N are integers, comprising
an input bus for transferring a data stream N bits wide,
an output bus for transferring a data stream M bits wide to and from destination circuitry,
a source of clock signals,
a plurality of N serial/parallel/serial shifters having inputs connected across said input bus, each having a serial output of M bits,
a first plurality of N latches, each having M bit width, said latches being connected to the outputs of the serial/parallel/serial shifters respectively and responsive to said clock signals for latching and recycling every M clock signals whereby a data stream M words long each N bits wide at the input bus are converted into N words M bits wide at the output bus for delivery to destination circuitry,
a second plurality of N latches, each having an input M bits wide connected to the output bus and having an output connected to the input bus, said serial/parallel/serial shifters being responsive to said clock signals for shifting data thereon N words, M bits wide, to said input bus as M words, N bits wide for redelivery to the input bus,
means for connecting the output of the serial/parallel/serial shifters to the input bus.

2. The formatter as in claim 1 wherein said shifters and latches are programmable to change the value of N, and means for programming the shifters and latches to a predetermined value of N.

3. A video recording system for recording a video signal including a plurality of video fields and video sync pulses comprising,
a plurality of recording disks having a plurality of data recording surfaces thereon,
means for mounting said disks for coordinate rotating movement at a predetermined speed,
a servo disk mounted to rotate in aligned synchronism with said recording disks, said servo disk including a surface carrying a servo reference signal
a plurality of read/write heads and a servo read head each of which is associated to a respective one of said recording surfaces and to said servo disk surface, respectively,
actuator means for mounting said plurality of heads and including arm means for carrying said heads over each respective surface in predetermined alignment with respect thereto to define a plurality of data tracks and a servo track on which data and servo information is recorded and, means for synchronizing the video recording so that each video field is recorded on a single cylinder defined collectively by the plurality of the data tracks on the recording surfaces taken together with said servo surface so that said servo signal serves to establish a position synchronizing signal to which said plurality of data tracks are physically synchronized, motor means for rotating said disks, means for incrementally adjusting the speed of the motor means including a phase lock loop having a high frequency output pulse triggered by said video sync pulses, means for comparing said servo reference signal with said phase lock loop signal, and shift means for adding or subtracting at least one output pulse to or from the output of said phase lock loop circuit between said video sync pulses.

4. A video recording method for a video signal including synchronization pulses defining fields, said signal being converted into a parallel digitized data stream, the steps of providing a plurality of recording disks having a plurality of data recording surfaces thereon, rotating said disks together in coordinate movement, providing a servo disk mounted to rotate with said recording disks and having a surface containing tracks of servo reference signal, providing a first plurality of read/write heads and a servo reading head each associated with one of said recording and servo disk surfaces respectively, actuating said first plurality of heads over each respective recording surface in a first zone, providing a second plurality of read/write heads and a servo head each associated with one said recording and servo surfaces, respectively actuating said second plurality of heads and said servo head in a second zone independently of said actuating step of said first plurality of heads, synchronizing the video recording so that each video field is recorded on the single cylinder defined collectively by tracks on all recording surfaces of one zone taken together, establishing a position synchronizing signal from said servo control disk to which all said data tracks are physically synchronized and, recording alternate video fields through said first and second pluralities of heads on alternative zones.

5. A video disk recording system comprising, a magnetic disk having a recording surface, a read/write head associated with said recording surface, actuator means for mounting said read/write head over said recording surface, a read/write amplifier including a magnetic head operating circuit mounted on said actuator means and including a write circuit for providing a current source in response to write signals, and a read circuit including a low noise preamplifier, solid state switching means for selectively connecting said read circuit or said write circuit to said head and for switching rapidly therebetween, said switching means being under control of an electrical signal, said read circuit, write circuit, solid state switching means being constructed as discrete hybrid circuits, and means for mounting said hybrid circuits on said actuator means in proximity of its associated read/write head.

6. The system as in claim 5 in which each said read/write head includes means forming a bifilar wound magnetic head, and said switching means includes a high current write amplifier, a low noise read preamplifier, and a diode switching circuit responsive to a first bias condition for connecting said write amplifier to said bifilar head and for being non-conductive to signals at the input of said pre-amplifier, and further responsive to a second bias condition for rendering said write amplifier inoperative while becoming conductive to read signals from said head.

* * * * *